(12) United States Patent
Arakawa et al.

(10) Patent No.: US 11,217,962 B2
(45) Date of Patent: Jan. 4, 2022

(54) LASER SYSTEM

(71) Applicant: Gigaphoton Inc., Tochigi (JP)

(72) Inventors: Masaki Arakawa, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 29 days.

(21) Appl. No.: 16/707,880

(22) Filed: Dec. 9, 2019

(65) Prior Publication Data
US 2020/0112137 A1 Apr. 9, 2020

Related U.S. Application Data

(63) Continuation of application No. PCT/JP2017/025507, filed on Jul. 13, 2017.

(51) Int. Cl.
*H01S 3/23* (2006.01)
*G02B 27/09* (2006.01)
(Continued)

(52) U.S. Cl.
CPC ........ *H01S 3/2366* (2013.01); *G02B 27/0927* (2013.01); *H01S 3/0071* (2013.01); *H01S 3/038* (2013.01); *H01S 3/08059* (2013.01); *H01S 3/2325* (2013.01); *H01S 3/2375* (2013.01); *G02B 5/001* (2013.01);
(Continued)

(58) Field of Classification Search
CPC ........ H01S 3/2308–235; H01S 3/2375; H01S 3/2366; H01S 2301/206; H01S 3/005; H01S 3/10084; H01S 3/10092; G02B 27/0927; G02B 5/001; G02B 27/0972
See application file for complete search history.

(56) References Cited

U.S. PATENT DOCUMENTS 4,755,027 A * 7/1988 Schafer ................ G02B 5/3025
359/485.02
6,014,401 A * 1/2000 Godard ................. H01S 3/2316
372/97
(Continued)

FOREIGN PATENT DOCUMENTS

DE 10 2008 056 315 A1 5/2010
EP 1233483 A1 8/2002
(Continued)

OTHER PUBLICATIONS

International Search Report issued in PCT/JP2017/025507; dated Sep. 26, 2017.
(Continued)

*Primary Examiner* — Joshua King
(74) *Attorney, Agent, or Firm* — Studebaker & Brackett PC

(57) ABSTRACT

A laser system includes: A. a solid-state laser apparatus configured to output a pulse laser beam having light intensity distribution in a Gaussian shape that is rotationally symmetric about an optical path axis; B. an amplifier including a pair of discharge electrodes and configured to amplify the pulse laser beam in a discharge space between the pair of discharge electrodes; and C. a conversion optical system configured to convert the light intensity distribution of the pulse laser beam output from the amplifier into a top hat shape in each of a discharge direction of the pair of discharge electrodes and a direction orthogonal to the discharge direction.

4 Claims, 23 Drawing Sheets

(51) Int. Cl.
  *H01S 3/00* (2006.01)
  *H01S 3/038* (2006.01)
  *H01S 3/08* (2006.01)
  *H01S 3/225* (2006.01)
  *G02B 5/00* (2006.01)
  *H01S 3/083* (2006.01)

(52) U.S. Cl.
  CPC .......... *G02B 27/0972* (2013.01); *H01S 3/005* (2013.01); *H01S 3/0835* (2013.01); *H01S 3/225* (2013.01); *H01S 2301/206* (2013.01)

(56) References Cited

U.S. PATENT DOCUMENTS

| | | | | |
|---|---|---|---|---|
| 6,356,575 | B1* | 3/2002 | Fukumoto | H01S 3/082 372/97 |
| 10,297,968 | B2* | 5/2019 | Filgas | G02B 6/4214 |
| 2003/0112494 | A1* | 6/2003 | Barty | H01S 3/0057 359/330 |
| 2004/0202220 | A1* | 10/2004 | Hua | H01S 3/2333 372/57 |
| 2005/0046856 | A1* | 3/2005 | Rao | H01S 3/0385 356/454 |
| 2005/0063446 | A1* | 3/2005 | Betin | H01S 3/10023 372/98 |
| 2005/0068538 | A1* | 3/2005 | Rao | H01S 3/2366 356/451 |
| 2006/0146384 | A1* | 7/2006 | Schultz | G02B 27/0927 359/9 |
| 2007/0091968 | A1 | 4/2007 | Wakabayashi et al. | |
| 2007/0280311 | A1* | 12/2007 | Hofmann | B23K 26/0622 372/30 |
| 2007/0297483 | A1* | 12/2007 | Wakabayashi | H01S 3/2308 372/97 |
| 2008/0095209 | A1* | 4/2008 | Wakabayashi | H01S 3/2333 372/57 |
| 2008/0198882 | A1* | 8/2008 | Clar | G03F 7/70025 372/34 |
| 2010/0078577 | A1* | 4/2010 | Moriya | H01S 3/10 250/504 R |
| 2012/0250708 | A1* | 10/2012 | Onose | H01S 3/2316 372/25 |
| 2013/0135601 | A1* | 5/2013 | Okazaki | G03F 7/70408 355/67 |
| 2013/0279526 | A1* | 10/2013 | Kakizaki | H01S 3/08 372/5 |
| 2016/0147075 | A1 | 5/2016 | Michalowski et al. | |
| 2016/0164240 | A1* | 6/2016 | Boland | H01S 3/2316 359/238 |
| 2016/0248219 | A1* | 8/2016 | Wakabayashi | H01S 3/2375 |
| 2017/0149199 | A1* | 5/2017 | Tei | H01S 3/2308 |
| 2017/0338620 | A1* | 11/2017 | Arakawa | H01S 3/2316 |
| 2018/0001417 | A1* | 1/2018 | Dulaney | H01S 3/10092 |
| 2018/0109065 | A1* | 4/2018 | Sasaki | H01S 3/10084 |
| 2018/0175581 | A1* | 6/2018 | Di Teodoro | H01S 3/06758 |
| 2020/0346301 | A1* | 11/2020 | Yao | B23K 26/356 |

FOREIGN PATENT DOCUMENTS

| | | | | |
|---|---|---|---|---|
| EP | 1604435 | B1 * | 11/2009 | ............ H01S 3/235 |
| EP | 2965852 | A1 * | 1/2016 | ........ B23K 26/0652 |
| FR | 2580122 | A1 * | 10/1986 | .......... H01S 3/0057 |
| JP | H09-304266 | A | 11/1997 | |
| JP | 2003-114400 | A | 4/2003 | |
| JP | 2004-039767 | A | 2/2004 | |
| JP | 2009-259860 | A | 11/2009 | |
| JP | 2010-004053 | A | 1/2010 | |
| JP | 2011-176116 | A | 9/2011 | |
| JP | 2012-204818 | A | 10/2012 | |
| JP | 2013-145863 | A | 7/2013 | |
| JP | 2016-097448 | A | 5/2016 | |
| JP | WO2015128943 | A1 * | 3/2017 | ............ H05G 2/003 |
| WO | 95/18984 | A1 | 7/1995 | |
| WO | 2004/095661 | A1 | 11/2004 | |
| WO | WO-2005093914 | A1 * | 10/2005 | .......... H01S 3/1001 |
| WO | WO-2014154193 | A1 * | 10/2014 | .......... H01S 3/1003 |
| WO | 2015092855 | A1 | 6/2015 | |
| WO | WO-2015128943 | A1 * | 9/2015 | .......... H01S 3/2366 |
| WO | 2016046871 | A1 | 3/2016 | |
| WO | WO-2016046871 | A1 * | 3/2016 | .......... H01S 3/1308 |
| WO | WO-2016112301 | A1 * | 7/2016 | .......... H01S 3/0085 |
| WO | WO-2016151827 | A1 * | 9/2016 | .......... H01S 3/2308 |
| WO | 2017006418 | A1 | 1/2017 | |
| WO | WO-2018020564 | A1 * | 2/2018 | .......... H01S 3/0057 |
| WO | WO-2018110222 | A1 * | 6/2018 | ......... H01S 3/06754 |

OTHER PUBLICATIONS

International Preliminary Report on Patentability and Written Opinion issued in PCT/JP2017/025507; dated Jan. 14, 2020.

Hoffnagle, John A. et al., "Design and performance of a refractive optical system that converts a Gaussian to a flattop beam", Applied Optics, Oct. 20, 2000, vol. 39, No. 30, pp. 5488-5499, doi: 10.1364/ao.39.005488.

An Office Action; "Notice of Reasons for Refusal", mailed by the Japanese Patent Office dated May 25, 2021, which corresponds to Japanese Patent Application No. 2019-529387 and is related to U.S. Appl. No. 16/707,880; with English language translation.

\* cited by examiner

LASER SYSTEM

CROSS-REFERENCE TO RELATED APPLICATIONS

The present application is a continuation application of International Application No. PCT/JP2017/025507 filed on Jul. 13, 2017. The content of the application is incorporated herein by reference in its entirety.

BACKGROUND

1. Technical Field

The present disclosure relates to a laser system.

2. Related Art

In a semiconductor exposure apparatus, resolving power improvement has been requested along with miniaturization and high integration of a semiconductor integrated circuit. Hereinafter, the semiconductor exposure apparatus is simply referred to as an ""exposure apparatus"". Thus, the wavelength of light output from an exposure light source has been shortened. A gas laser apparatus is used as the exposure light source in place of a conventional mercury lamp. Examples of the laser apparatus currently used for exposure include a KrF excimer laser apparatus configured to output an ultraviolet ray having a wavelength of 248 nm, and an ArF excimer laser apparatus configured to output an ultraviolet ray having a wavelength of 193.4 nm.

Immersion exposure has been practically used as a current exposure technology. In the immersion exposure, the apparent wavelength of the exposure light source is shortened by filling the gap between a projection lens on the exposure apparatus side and a wafer with liquid to change the refractive index of the gap. When the immersion exposure is performed by using the ArF excimer laser apparatus as the exposure light source, the wafer is irradiated with ultraviolet light having a wavelength of 134 nm in water. This technology is called ArF immersion exposure. The ArF immersion exposure is also called ArF immersion lithography.

The KrF excimer laser apparatus and the ArF excimer laser apparatus each have a wide spectrum line width of 350 pm to 400 pm approximately due to spontaneous oscillation. Thus, chromatic aberration occurs to a laser beam (ultraviolet ray light) projected in a reduced scale on the wafer through the projection lens on the exposure apparatus side, which leads to resolving power decrease. Thus, the spectrum line width of a laser beam output from the gas laser apparatus needs to be narrowed so that the chromatic aberration becomes negligible. To narrow the spectrum line width, a line narrowing module including a line narrowing element is provided in a laser resonator of the gas laser apparatus. The narrowing of the spectrum line width is achieved by the line narrowing module. The line narrowing element may be, for example, an etalon or a grating. A laser apparatus that achieves the narrowing of the spectrum line width in this manner is referred to as a line narrowing laser apparatus.

LIST OF DOCUMENTS

Patent Documents

Patent Document 1: International Patent Publication No. 2016/046871
Patent Document 2: Japanese Unexamined Patent Application Publication No. 2011-176116
Patent Document 3: Japanese Unexamined Patent Application Publication No. 2013-145863
Patent Document 4: International Patent Publication No. 2017/006418

SUMMARY

A laser system according to one aspect of the present disclosure includes: A. a solid-state laser apparatus configured to output a pulse laser beam having light intensity distribution in a Gaussian shape that is rotationally symmetric about an optical path axis; B. an amplifier including a pair of discharge electrodes and configured to amplify the pulse laser beam in a discharge space between the pair of discharge electrodes; and C. a conversion optical system configured to convert the light intensity distribution of the pulse laser beam output from the amplifier into a top hat shape in each of a discharge direction of the pair of discharge electrodes and a direction orthogonal to the discharge direction.

BRIEF DESCRIPTION OF THE DRAWINGS

Embodiments of the present disclosure will be described below as examples with reference to the accompanying drawings.

DESCRIPTION OF EMBODIMENTS

Figure 1A:
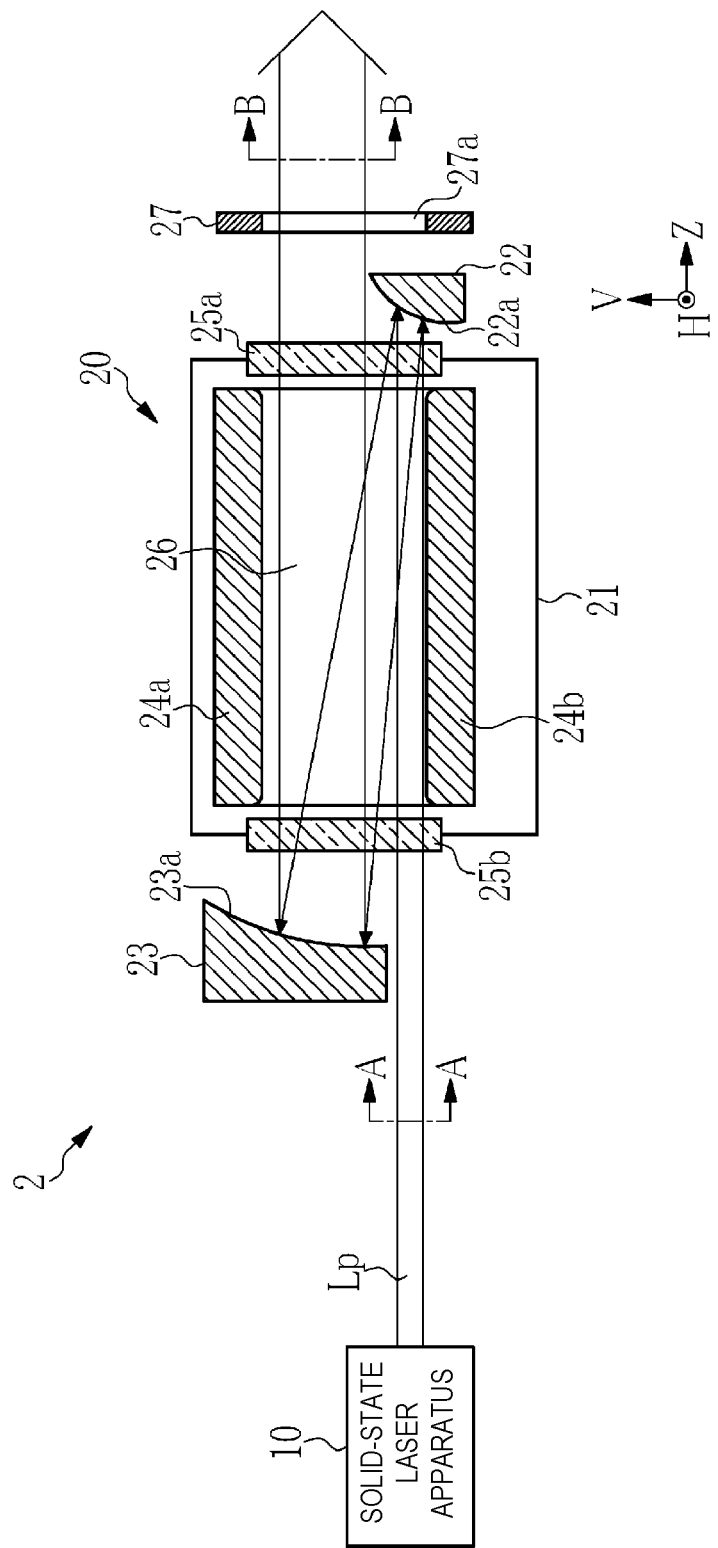
FIG. 1A is a cross-sectional view schematically illustrating the configuration of a laser system according to a comparative example.

<Contents>
1. Comparative example
1.1 Configuration
1.1.1 Solid-state laser apparatus
1.1.2 Amplifier
1.2 Operation
1.3 Problem
2. First embodiment
2.1 Configuration
2.2 Operation
2.3 Effect
2.4 Definition of top hat shape
2.5 Modification of conversion optical system
3. Second embodiment
3.1 Configuration
3.2 Operation
3.3 Effect
4. Third embodiment
4.1 Configuration
4.1.1 Designing example
4.2 Operation
4.3 Effect
5. Fourth embodiment
5.1 Configuration
5.2 Operation
5.3 Effect
5.4 Modification of conversion optical system
5.4.1 Configuration
5.4.2 Operation
5.4.3 Effect
6. Fifth embodiment
6.1 Configuration
6.2 Operation
6.3 Effect
7. Specific example of solid-state laser apparatus
7.1 Configuration
7.2 Operation
8. Modification of amplifier
8.1 Configuration
8.2 Operation Embodiments of the present disclosure will be described below in detail with reference to the accompanying drawings. The embodiments described below are examples of the present disclosure, and do not limit the contents of the present disclosure. Not all configurations and operations described in each embodiment are necessarily essential as configurations and operations of the present disclosure. Components identical to each other are denoted by an identical reference sign, and duplicate description thereof will be omitted.

1. Comparative Example 1.1 Configuration

Figure 1B:
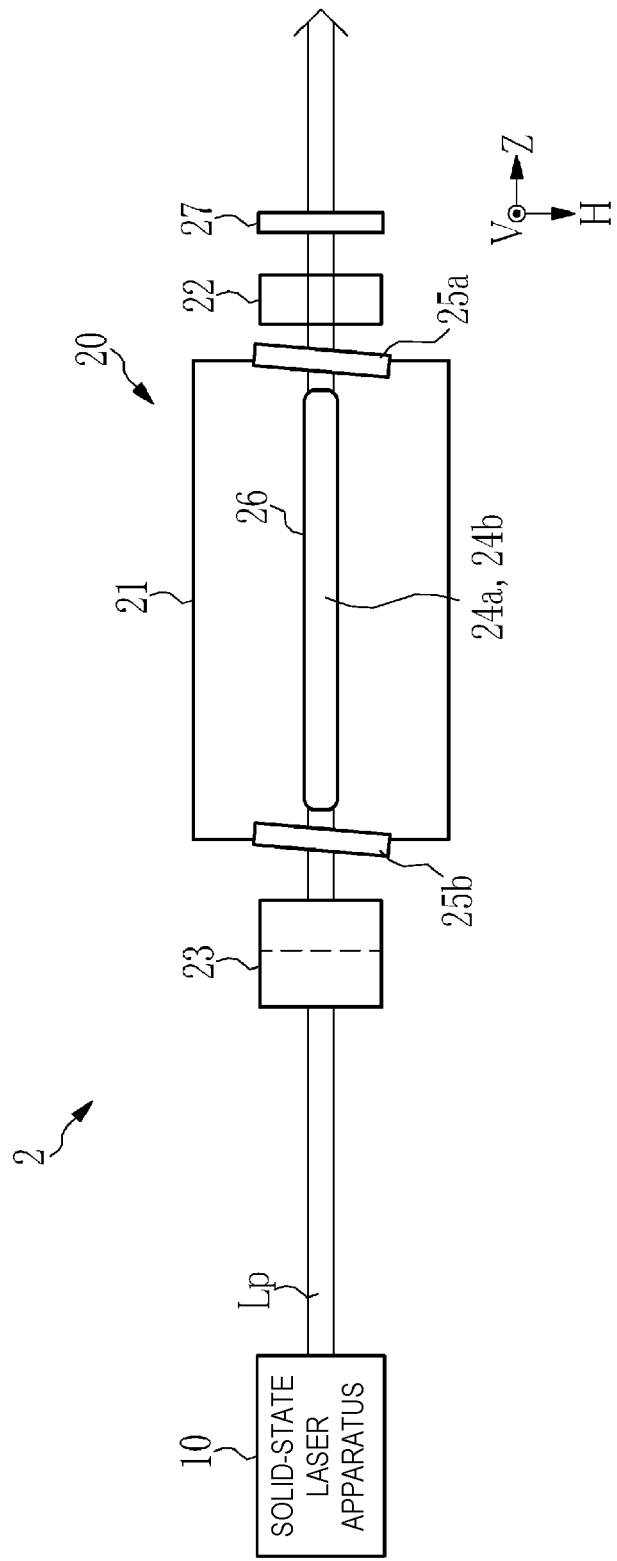
FIG. 1B is a pattern diagram of the internal configuration of an amplifier in the laser system illustrated in FIG. 1A when viewed in a V direction.

FIGS. 1A and 1B illustrate the entire configuration of a laser system 2 according to a comparative example. The laser system 2 includes a solid-state laser apparatus 10 as a master oscillator, and an amplifier 20 as a power amplifier.

1.1.1 Solid-State Laser Apparatus

The solid-state laser apparatus 10 includes, for example, a semiconductor laser, an amplifier, and a non-linear crystal (those are not illustrated). The solid-state laser apparatus 10 outputs an ultraviolet pulse laser beam Lp in a single transverse mode. The pulse laser beam Lp is a Gaussian beam having, for example, a central wavelength of 193.4 nm. Hereinafter, the optical path axis direction of the pulse laser beam Lp output from the solid-state laser apparatus 10 is referred to as a Z direction.

1.1.2 Amplifier

The amplifier 20 is an excimer amplifier including a chamber 21, a convex surface cylindrical mirror 22, and a concave surface cylindrical mirror 23. The chamber 21 includes a first discharge electrode 24a, a second discharge electrode 24b, a first window 25a, and a second window 25b. The chamber 21 encapsulates, for example, ArF laser gas containing Ar gas as rare gas, fluorine gas as halogen gas, and Ne gas as buffer gas.

The first discharge electrode 24a and the second discharge electrode 24b are oppositely disposed as a pair of electrodes for exciting the laser gas by electrical discharging through a discharge space 26 interposed therebetween. The first discharge electrode 24a and the second discharge electrode 24b each extend in the Z direction. High voltage in pulses is applied from a power source (not illustrated) to the space between the first discharge electrode 24a and the second discharge electrode 24b. Hereinafter, a direction in which the first discharge electrode 24a and the second discharge electrode 24b face to each other, in other words, a discharge direction is referred to as a V direction. The V direction is orthogonal to the Z direction. A direction orthogonal to the V direction and the Z direction is referred to as an H direction.

The first window 25a and the second window 25b are parallel to each other and disposed facing to each other in the Z direction through the discharge space 26. The first window 25a and the second window 25b are disposed at positions where the pulse laser beam Lp output from the solid-state laser apparatus 10 is incident. The first window 25a and the second window 25b are also disposed so that the incident angle of the laser beam is, for example, 56.34±5°, which is an angle close to Brewster's angle. The first window 25a and the second window 25b are parallel plane substrates each made of $CaF_2$ crystal.

The convex surface cylindrical mirror 22 includes a convex surface 22a. The concave surface cylindrical mirror 23 includes a concave surface 23a. The convex surface 22a and the concave surface 23a are each part of a cylindrical surface having a central axis parallel to the H direction. A high reflection film (not illustrated) for the pulse laser beam Lp having a wavelength of 193.4 nm is formed on each of the convex surface 22a and the concave surface 23a. The convex surface cylindrical mirror 22 is disposed so that the pulse laser beam Lp output from the solid-state laser apparatus 10 and having passed through the second window 25b and the first window 25a is incident on the convex surface 22a. The convex surface cylindrical mirror 22 expands the beam diameter of the pulse laser beam Lp in the V direction as the discharge direction.

The concave surface cylindrical mirror 23 is disposed so that the pulse laser beam Lp highly reflected by the convex surface 22a and having passed through the first window 25a and the second window 25b is incident on the concave surface 23a. The concave surface cylindrical mirror 23 is disposed to reflect the pulse laser beam Lp incident on the concave surface 23a and to output the pulse laser beam Lp in the Z direction through the second window 25b and the first window 25a. The curvature of the concave surface 23a is set so that reflected light of the pulse laser beam Lp is collimated.

The convex surface cylindrical mirror 22 and the concave surface cylindrical mirror 23 are configured so that the pulse laser beam Lp incident on the amplifier 20 passes through the discharge space 26 three times and is output to the outside of the amplifier 20. In addition, the convex surface cylindrical mirror 22 reflects the incident pulse laser beam Lp and expands the beam diameter thereof in the V direction as the discharge direction. In this manner, the convex surface cylindrical mirror 22 and the concave surface cylindrical mirror 23 configure a pair of returning mirrors that return the optical path of the pulse laser beam Lp to form a plurality of optical paths in the discharge space 26. The amplifier 20 is referred to as a multipath amplifier.

Figure 2:
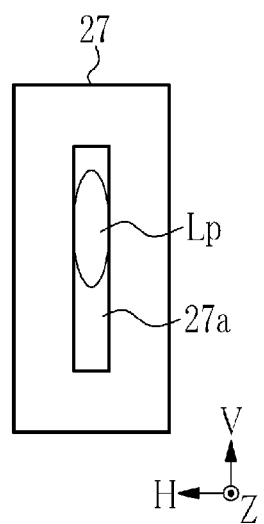
FIG. 2 is a pattern diagram of a slit when viewed in a Z direction.

The amplifier 20 includes a slit 27. The slit 27 is disposed on the optical path of the pulse laser beam Lp output from the chamber 21. FIG. 2 is a pattern diagram of the slit 27 when viewed in the Z direction. The slit 27 is configured by forming a rectangular opening 27a at the center of a light-shielding member. The length of the opening 27a in the V direction is substantially equal to the interval between the first discharge electrode 24a and the second discharge electrode 24b. The length of the opening 27a in the H direction is substantially equal to the width of each of the first discharge electrode 24a and the second discharge electrode 24b.

The slit 27 is disposed so that the position of the opening 27a in the V direction and the H direction corresponds to the discharge space 26. The slit 27 shields part of the incident pulse laser beam Lp outside the opening 27a. The slit 27 is not limited to disposition outside the chamber 21, but may be disposed inside the chamber 21.

1.2 Operation

The following describes operation of the laser system 2 according to the comparative example. After being output from the solid-state laser apparatus 10, the pulse laser beam Lp travels in the Z direction. The pulse laser beam Lp passes below the concave surface cylindrical mirror 23 and is incident in the discharge space 26 as a seed beam. The pulse laser beam Lp incident in the discharge space 26 travels in the Z direction and is incident on the convex surface cylindrical mirror 22. While passing through the discharge space 26, the pulse laser beam Lp is amplified by the laser gas excited by electrical discharging that occurs in the discharge space 26.

The pulse laser beam Lp incident on the convex surface cylindrical mirror 22 is highly reflected by the convex surface 22a and passes through the discharge space 26 while the beam diameter thereof is expanded in the V direction. Accordingly, the pulse laser beam Lp is further amplified and then is incident on the concave surface cylindrical mirror 23. The pulse laser beam Lp incident on the concave surface cylindrical mirror 23 is highly reflected by the concave surface 23a and collimated, and then travels through the discharge space 26 in the Z direction. The collimated pulse laser beam Lp is further amplified while passing through the discharge space 26, passes above the convex surface cylindrical mirror 22, and is incident on the slit 27. As illustrated in FIG. 2, a component of the pulse laser beam Lp incident on the slit 27 outside the opening 27a is shielded, and a component thereof having passed through the opening 27a is output to the outside of the laser system 2. The pulse laser beam Lp output from the laser system 2 is incident on an exposure apparatus (not illustrated).

1.3 Problem

Figure 3A:
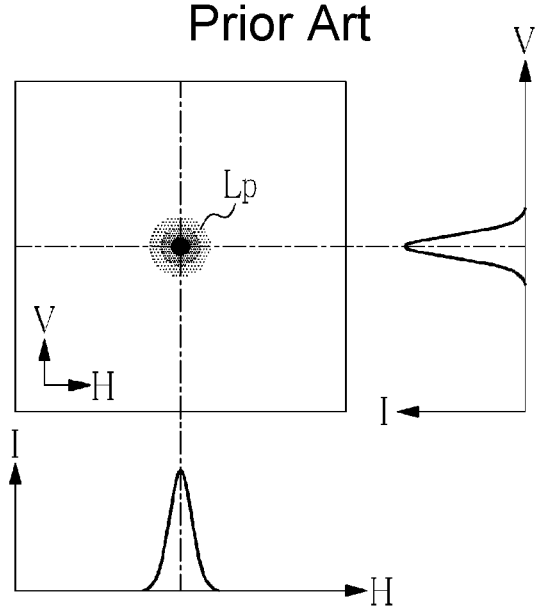
FIG. 3A is a diagram illustrating the light intensity distribution of a pulse laser beam at a beam section along line A-A in FIG. 1A.
Figure 3B:
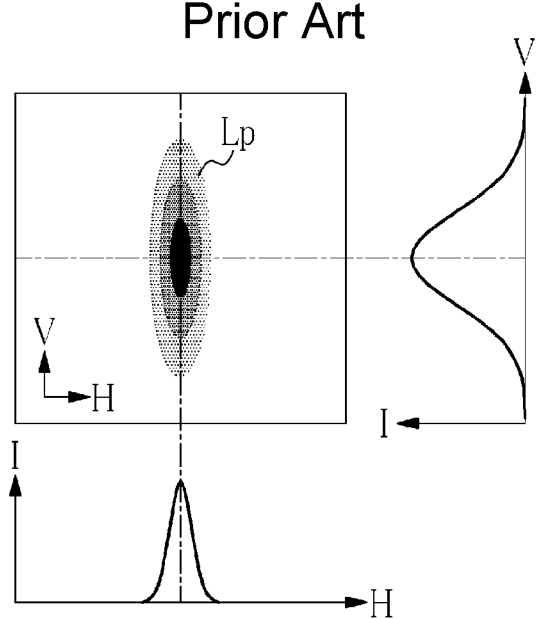
FIG. 3B is a diagram illustrating the light intensity distribution of the pulse laser beam at a beam section along line B-B in FIG. 1A.

The following describes a problem with the laser system 2 according to the comparative example. FIG. 3A illustrates the light intensity distribution of the pulse laser beam Lp at a beam section along line A-A in FIG. 1A. FIG. 3B illustrates the light intensity distribution of the pulse laser beam Lp at a beam section along line B-B in FIG. 1A.

As illustrated in FIG. 3A, the light intensity distribution of the pulse laser beam Lp output from the solid-state laser apparatus 10 has a Gaussian shape that is rotationally symmetric about a Z axis as the optical path axis. The pulse laser beam Lp is incident on the amplifier 20 as a seed beam, passes through the first window 25a and the second window 25b while being amplified in the discharge space 26, and is output from the amplifier 20. As illustrated in FIG. 3B, the pulse laser beam Lp output from the amplifier 20 has a Gaussian shape in which the light intensity distribution is expanded in the V direction.

Light intensity I of the pulse laser beam Lp incident on the amplifier 20 as a seed beam is high at a central part of the light intensity distribution and low at an end part thereof. Thus, the maximum value of the light intensity, in other words, the energy density of the pulse laser beam Lp after amplification by the amplifier 20 is potentially higher than that of a laser beam output from a normal excimer laser apparatus. Accordingly, in the laser system 2 according to the comparative example, the first window 25a and the second window 25b are likely to degrade due to passing of the pulse laser beam Lp, and thus the durability is low.

2. First Embodiment

The following describes a laser system according to a first embodiment of the present disclosure.

2.1 Configuration

Figure 4A:
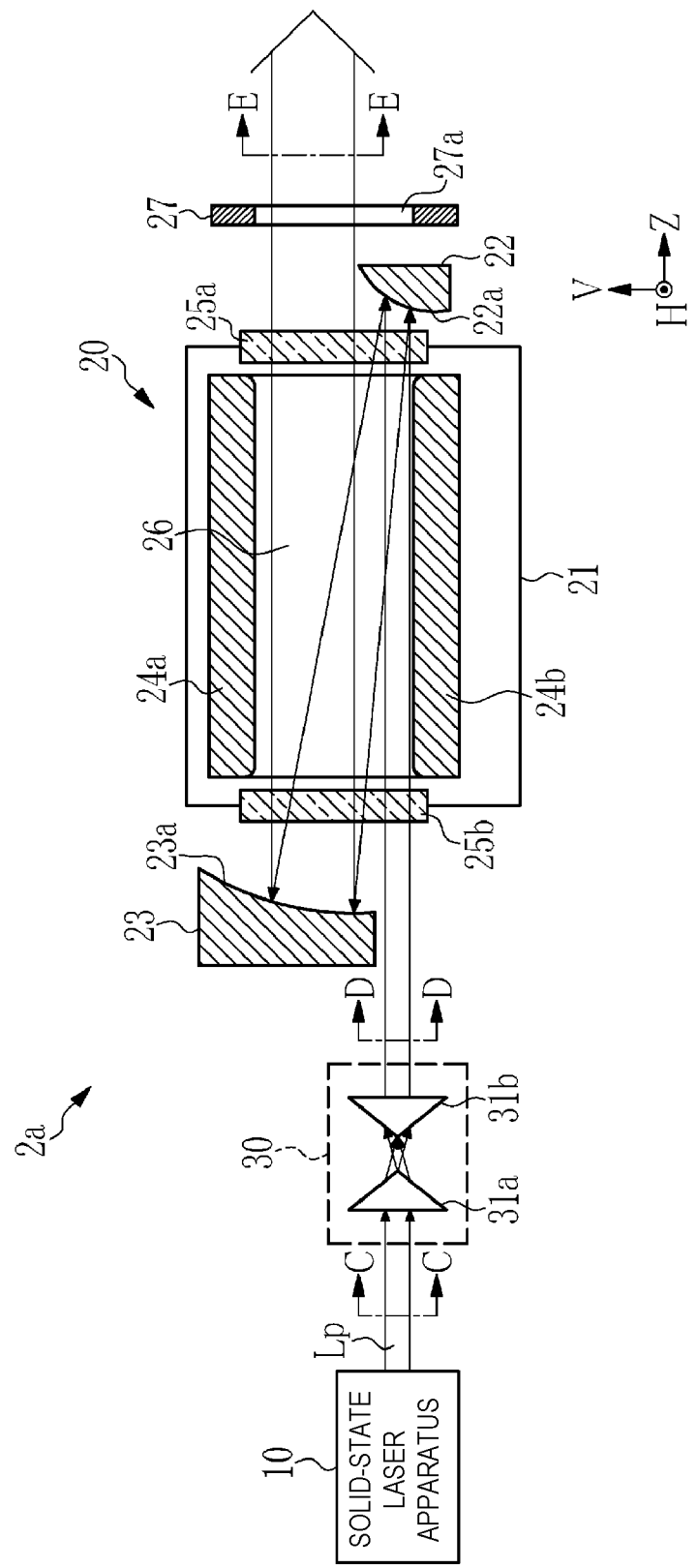
FIG. 4A is a cross-sectional view schematically illustrating the configuration of a laser system according to a first embodiment.
Figure 4B:
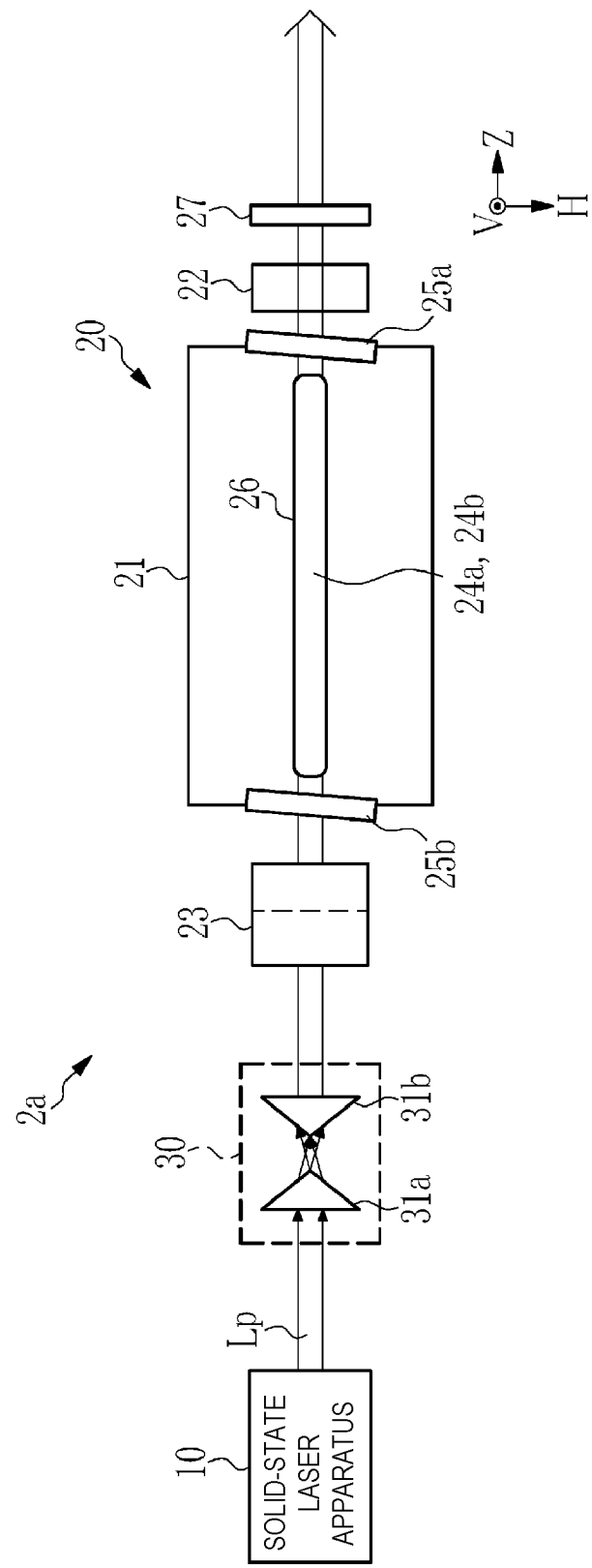
FIG. 4B is a pattern diagram of the internal configuration of an amplifier in the laser system illustrated in FIG. 4A when viewed in the V direction.

FIGS. 4A and 4B illustrate the entire configuration of a laser system 2a according to the first embodiment. The laser system 2a includes a conversion optical system 30 disposed on the optical path of the pulse laser beam Lp between the solid-state laser apparatus 10 and the amplifier 20. The other configuration of the laser system 2a is identical to the configuration of the laser system 2 according to the comparative example.

The conversion optical system 30 converts the light intensity distribution of the pulse laser beam Lp from a Gaussian shape into a top hat shape. The conversion optical system 30 includes a first axicon lens 31a and a second axicon lens 31b. The first axicon lens 31a and the second axicon lens 31b each has a conical shape and are each disposed so that the central axis thereof is aligned with the optical path axis of the pulse laser beam Lp. The first axicon lens 31a and the second axicon lens 31b are disposed so that the apexes thereof face to each other in the Z direction.

2.2 Operation

The following describes operation of the laser system 2a according to the first embodiment. After being output from the solid-state laser apparatus 10, the pulse laser beam Lp travels in the Z direction and is incident on the conversion optical system 30. The pulse laser beam Lp incident on the conversion optical system 30 from the solid-state laser apparatus 10 has a Gaussian shape that is rotationally symmetric about the Z axis as the optical path axis. The light intensity distribution of the pulse laser beam Lp at a beam section along line C-C in FIG. 4A is similar to the light intensity distribution illustrated in FIG. 3A.

Figure 5A:
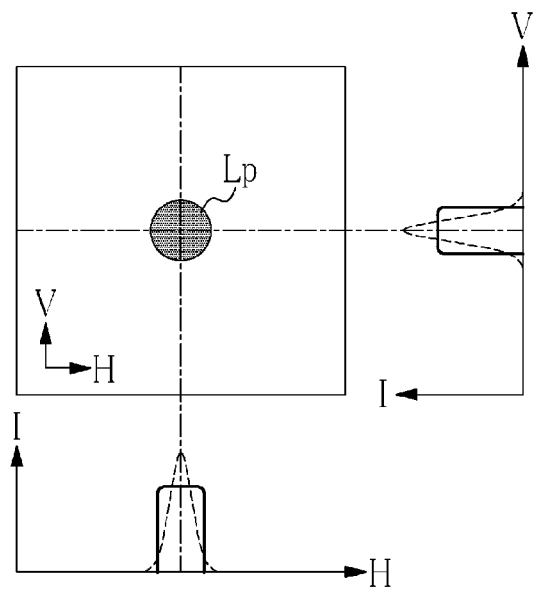
FIG. 5A is a diagram illustrating the light intensity distribution of a pulse laser beam Lp at a beam section along line D-D in FIG. 4A.

The pulse laser beam Lp incident on the conversion optical system 30 is then incident on the first axicon lens 31a. Of the pulse laser beam Lp incident on the first axicon lens 31a, part on the positive side of the central axis refracts and travels toward the negative side, and part on the negative side of the central axis refracts and travels toward the positive side. For example, this travel distance is substantially equal to the half width at half maximum of the light intensity distribution. As these light parts transmit through the second axicon lens 31b, the light intensity distribution of the pulse laser beam Lp becomes a top hat shape. In this manner, the light intensity distribution of the pulse laser beam Lp incident on the conversion optical system 30 is converted from a Gaussian shape into a top hat shape, and then the pulse laser beam Lp is output. As illustrated in FIG. 5A, the light intensity distribution of the pulse laser beam Lp at a beam section along line D-D in FIG. 4A has a top hat shape in each of the V direction and the H direction.

The pulse laser beam Lp, the light intensity distribution of which has become a top hat shape is incident on the amplifier 20 as a seed beam. Then, similarly to the comparative example, while passing through the discharge space 26, the pulse laser beam Lp is amplified and the beam diameter thereof is expanded in the V direction as the discharge direction. When the amplifier 20 has substantially uniform gain distribution in the discharge space 26, the light intensity distribution of the pulse laser beam Lp at a beam section along line E-E in FIG. 4A has a top hat shape in each of the V direction and the H direction as illustrated in FIG. 5B.

2.3 Effect

Figure 5B:
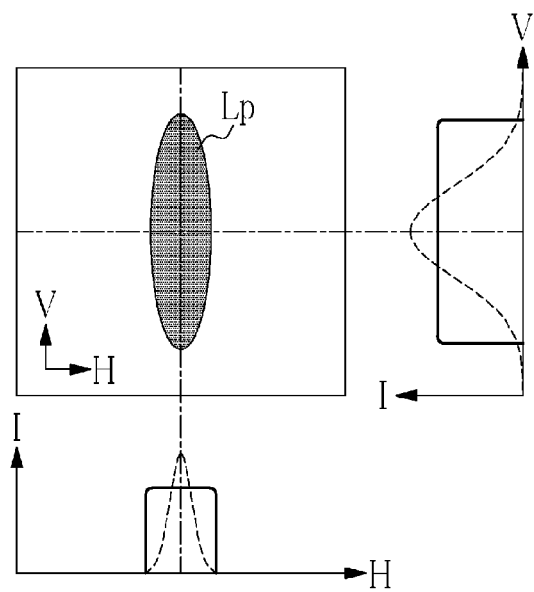
FIG. 5B is a diagram illustrating the light intensity distribution of the pulse laser beam at a beam section along line E-E in FIG. 4A.

Each dashed line illustrated in FIGS. 5A and 5B represents the light intensity distribution having a Gaussian shape in a case of the laser system 2 according to the comparative example. In the laser system 2a according to the first embodiment, the light intensity distribution of the pulse laser beam Lp output from the solid-state laser apparatus 10 is converted from a Gaussian shape into a top hat shape by the conversion optical system 30 before the pulse laser beam Lp is incident on the amplifier 20. The maximum energy density of the pulse laser beam Lp decreases through the conversion of the light intensity distribution into a top hat shape, and thus degradation of the first window 25a and the second window 25b reduces and the durability improves.

2.4 Definition of Top Hat Shape

Figure 6:
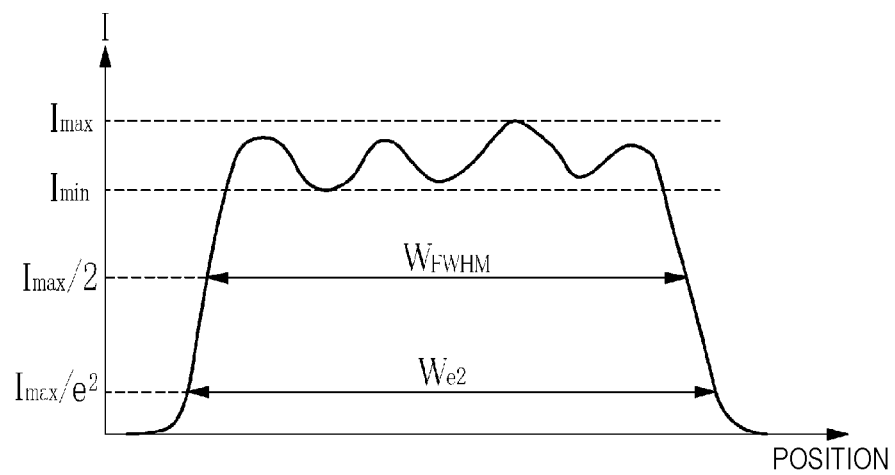
FIG. 6 is a graph for description of definition of a top hat shape of light intensity distribution.

The following describes definition of a top hat shape of light intensity distribution based on FIG. 6. The top hat shape is defined by using a top hat region ratio $R_{TOP}$ (%) expressed by Expression (1) below and uniformity C (%) expressed by Expression (2) below.

$$R_{TOP} = W_{FWHM}/W_{e2} \times 100 \qquad (1)$$

$$C = (I_{max} - I_{min})/(I_{max} + I_{min}) \times 100 \qquad (2)$$

In the above expression, $I_{max}$ represents the maximum value of light intensity in light intensity distribution, $I_{max}$ represents the local minimum value of light intensity in a region at $I_{max}/2$ or higher, $W_{FWHM}$ represents the beam diameter at $I = I_{max}/2$, what is called full width at half maximum, and $W_{e2}$ represents the beam diameter at $I = I_{max}/e^2$, what is called $1/e^2$ width.

In each of the V direction and the H direction, the shape of light intensity distribution is defined to be a top hat shape with reference to the optical path axis when the top hat region ratio $R_{TOP}$ and the uniformity C satisfy a first condition and a second condition. The first condition is such that the top hat region ratio $R_{TOP}$ is equal to or higher than 70%, preferably equal to or higher than 80%. The second condition is such that the uniformity C is equal to or lower than 20%, preferably equal to or lower than 10%.

In the above-described definition, a top hat shape is defined based on one-dimensional light intensity distribution, but may be defined based on two-dimensional light intensity distribution. The two-dimensional light intensity distribution can be measured by a two-dimensional image sensor. In this case, the top hat region ratio $R_{TOP}$ (%) can be defined by Expression (3) below.

$$R_{TOP} = S_{FWHM}/S_{e2} \times 100 \qquad (3)$$

In the above expression, $S_{FWHM}$ represents the area of a region having light intensity of $I_{max}/2$ or higher, and $S_{e2}$ represents the area of a region having light intensity of $I_{max}/e^2$ or higher.

2.5 Modification of Conversion Optical System

The following describes a modification of the conversion optical system. In the first embodiment, the conversion optical system configured to convert light intensity distribution from a Gaussian shape into a top hat shape uses a combination of two axicon lenses, but the conversion optical system is not limited to this configuration.

Figure 7:
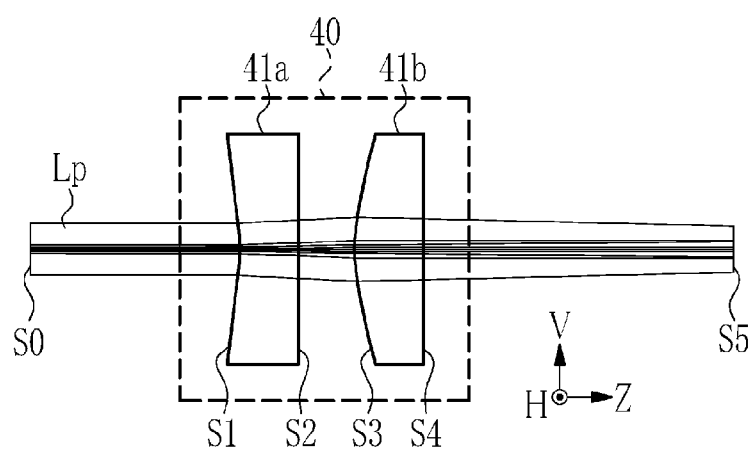
FIG. 7 is a diagram illustrating a conversion optical system according to a modification.

FIG. 7 illustrates a conversion optical system 40 according to the modification. The conversion optical system 40 is used in place of the conversion optical system 30 of the first embodiment. The conversion optical system 40 includes a first aspherical lens 41a and a second aspherical lens 41b. The first aspherical lens 41a and the second aspherical lens 41b each have a rotationally symmetric shape and are each disposed so that the central axis thereof is aligned with the optical path axis of the pulse laser beam Lp. The first aspherical lens 41a includes an aspherical concave surface S1 and a flat surface S2. The second aspherical lens 41b includes an aspherical convex surface S3 and a flat surface S4.

Typically, a rotationally symmetric asphere is expressed by a multinomial expansion expression of deviation from a spherical surface. For example, in an even-ordered asphere model, asphericity is expressed by using only even-ordered terms of radial coordinates. In this even-ordered asphere model, a sag amount z of the asphere in the Z direction is expressed by Expression (4) below.

[Mathematical 1]

$$z = \frac{ch^2}{1 + \sqrt{1 - (K+1)c^2h^2}} + Ah^4 + Bh^6 + Ch^8 + Dh^{10} + \ldots \quad (4)$$

In the expression, c represents curvature at the origin, in other words, central curvature, h represents distance from the origin and is expressed by $h^2=H^2+V^2$, K represents a Korenich constant, and A to D represent aspherical coefficients. An axially symmetric rotation curved surface is obtained by rotating a curved line expressed by Expression (4) about the Z axis.

Table 1 lists exemplary designed values of the conversion optical system 40 for converting light intensity distribution having a Gaussian shape and a $1/e^2$ width of 0.75 mm at a surface S0 in FIG. 7 into light intensity distribution having a top hat shape and a $1/e^2$ width of 1.50 mm at a surface S5 in FIG. 7. The wavelength of light is 193.4 nm.

TABLE 1

| Surface | Central curvature (mm$^{-1}$) | Radius (mm) | Korenich constant | Surface interval (mm) | Medium |
|---|---|---|---|---|---|
| S0 | 0.00 | 0.75 (1/e$^2$) | 0.00 | 30.00 | Air |
| S1 | −0.1601 | 10.00 | −71.13 | 5.00 | Synthetic quarts |
| S2 | 0.00 | 10.00 | 0.00 | | quarts |
| S3 | 0.07023 | 10.00 | −16.47 | 4.85 | Air |
| S4 | 0.00 | 10.00 | 0.00 | 6.00 | Synthetic quarts |
| S5 | 0.00 | 1.50 (1/e$^2$) | 0.00 | 50.00 | Air |

In Table 1, the central curvature, the radius, and the Korenich constant indicate values of each surface. High-order aspherical coefficients including A to D are all zero. The surface interval indicates the distance between the origins of two surfaces. The medium indicates a medium between two surfaces. The surfaces S0 and S5 are virtual surfaces orthogonal to the optical axis. The surface interval between the surfaces S1 and S2 indicates the thickness of the first aspherical lens 41a. The surface interval between the surfaces S3 and S4 indicates the thickness of the second aspherical lens 41b.

Figure 8:
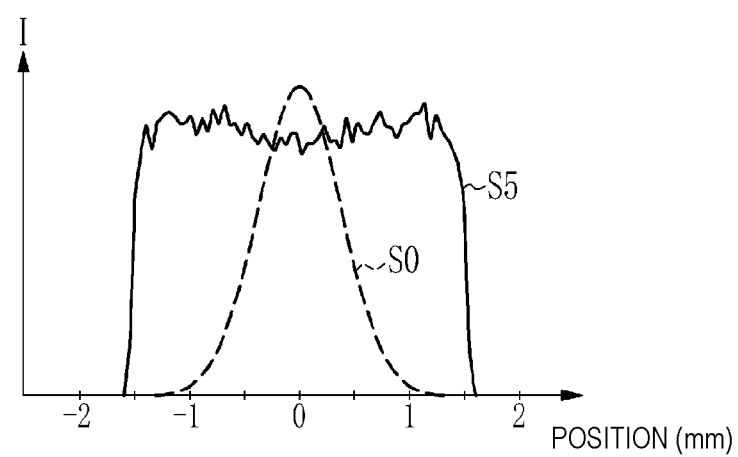
FIG. 8 is a graph illustrating a simulation result of light intensity distribution based on designed values indicated in FIG. 7 and Table 1.

FIG. 8 illustrates a simulation result of light intensity distribution based on the above-described designed values. The dashed line illustrates the light intensity distribution of the pulse laser beam Lp at the surface S0. The solid line illustrates the light intensity distribution of the pulse laser beam Lp at the surface S5. In the modification, top-hat characteristics of the light intensity distribution of the pulse laser beam Lp, in other words, the top hat region ratio $R_{TOP}$ and the uniformity C can be improved as compared to those in the first embodiment by optimizing the Korenich constant and the aspherical coefficients.

3. Second Embodiment

The laser system according to the first embodiment includes the conversion optical system as a combination of two axicon lenses. The performance of conversion from a Gaussian shape into a top hat shape improves as the shape of the apex of each axicon lens is more miniaturized, but the apex miniaturization has limitation. In addition, in a region a including the apex of each axicon lens and its vicinity, it is difficult to perform highly accurate polishing, and thus light scattering is likely to occur. Thus, when the beam diameter of a pulse laser beam incident on each axicon lens is small, the size ratio of the region a relative to the beam diameter is large, and transmittance decreases due to influence of light scattering and the like. Accordingly, the intensity at a central part of the light intensity distribution decreases. In the present specification, the region a is defined to be a region in which fabrication accuracy at the apex of the axicon lens and its vicinity cannot be guaranteed.

The size of a beam section is, for example, 3 mm×16 mm in a case of an excimer laser, but the beam diameter of a pulse laser beam output from the solid-state laser apparatus 10 used in the first embodiment is small at 1 mm to 2 mm approximately. Accordingly, the conversion optical system according to the first embodiment has a problem with conversion efficiency. The following describes, as a second embodiment, a laser system that achieves improvement of the conversion efficiency of a conversion optical system.

3.1 Configuration

Figure 9:
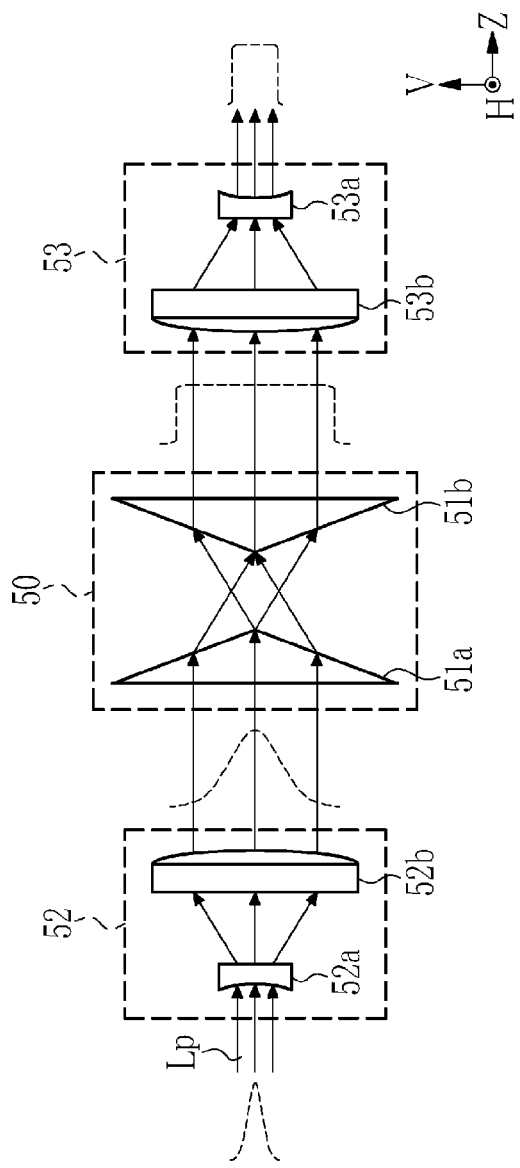
FIG. 9 is a diagram illustrating an expansion optical system and a contraction optical system included in a laser system according to a second embodiment.

As illustrated in FIG. 9, the laser system according to the second embodiment has a configuration identical to that of the laser system 2a according to the first embodiment except that an expansion optical system 52 and a contraction optical system 53 are provided in addition to a conversion optical system 50.

In FIG. 9, the conversion optical system 50 includes a first axicon lens 51a and a second axicon lens 51b. Similarly to the first embodiment, the first axicon lens 51a and the second axicon lens 51b each have a conical shape and are each disposed so that the central axis thereof is aligned with the optical path axis of the pulse laser beam Lp. The first axicon lens 51a and the second axicon lens 51b are disposed so that the apexes thereof face to each other in the Z direction.

The expansion optical system 52 includes a first concave lens 52a and a first convex lens 52b, and is disposed on the incident side of the conversion optical system 50. The first concave lens 52a and the first convex lens 52b are disposed so that the central axes thereof are aligned with the optical path axis of the pulse laser beam Lp and the positions of the focal points thereof coincide with each other. The first concave lens 52a is disposed on a side of the first convex lens 52b where the pulse laser beam Lp is incident. For example, the expansion optical system 52 expands the beam diameter of the pulse laser beam Lp at an expansion rate of 5 to 10 times magnification in each of the V direction and the H direction.

The contraction optical system 53 includes a second concave lens 53a and a second convex lens 53b, and is disposed on the emission side of the conversion optical system 50. The second concave lens 53a and the second convex lens 53b are disposed so that the central axes thereof are aligned with the optical path axis of the pulse laser beam Lp and the positions of the focal points thereof coincide with each other. The second concave lens 53a is disposed on a side of the second convex lens 53b where the pulse laser beam Lp is emitted. For example, the contraction optical system 53 contracts the beam diameter of the pulse laser beam Lp at a contraction rate of 1/5 to 1/10 times magnification in each of the V direction and the H direction.

The first concave lens 52a and the second concave lens 53a are concave lenses having identical sizes. The first convex lens 52b and the second convex lens 53b are convex lenses having identical sizes. The pair of the first concave lens 52a and the first convex lens 52b and the pair of the second concave lens 53a and the second convex lens 53b are symmetrically disposed facing to opposite directions in the Z direction. In other words, the expansion rate of the expansion optical system 52 is equal to the reciprocal of the contraction rate of the contraction optical system 53.

3.2 Operation

The pulse laser beam Lp having light intensity distribution in a Gaussian shape is incident on the conversion optical system 50 from the solid-state laser apparatus 10. The pulse laser beam Lp incident on the conversion optical system 50 is first incident on the expansion optical system 52, and the beam diameter thereof is expanded. The light intensity distribution of the pulse laser beam Lp having the expanded beam diameter is converted from a Gaussian shape into a top hat shape as the pulse laser beam Lp passes through the conversion optical system 50.

The pulse laser beam Lp emitted from the conversion optical system 50 is incident on the contraction optical system 53, and the beam diameter thereof is contracted while the light intensity distribution in a top hat shape is maintained. The pulse laser beam Lp emitted from the contraction optical system 53 is incident on the amplifier 20 as a seed beam while the light intensity distribution in a top hat shape is maintained.

3.3 Effect

According to the second embodiment, since the pulse laser beam Lp having a beam diameter expanded by the expansion optical system 52 is incident on the conversion optical system 50, the sizes of the first axicon lens 51a and the second axicon lens 51b included in the conversion optical system 50 can be increased. Accordingly, the size ratio of the region a of each of the first axicon lens 51a and the second axicon lens 51b relative to the beam diameter of the pulse laser beam Lp incident on the conversion optical system 50 decreases, and thus the transmittance of the pulse laser beam Lp improves. In other words, according to the second embodiment, intensity decrease at a central part in the light intensity distribution of the pulse laser beam Lp converted by the conversion optical system 50 is reduced. As a result, the efficiency of light intensity distribution conversion from a Gaussian shape into a top hat shape improves.

In the second embodiment, the conversion optical system 50 as a combination of two axicon lenses is used, but a conversion optical system as a combination of an aspherical concave lens and an aspherical convex lens, which is described above as the modification, may be used in place of the conversion optical system 50. In this case, the sizes of the concave lens and the convex lens can be increased, which facilitates formation of an asphere and leads to high accuracy of the asphere.

4. Third Embodiment

In the laser system 2a according to the first embodiment, the conversion optical system 30 configured to convert light intensity distribution from a Gaussian shape into a top hat shape is disposed between the solid-state laser apparatus 10 and the amplifier 20, but the conversion function of the conversion optical system 30 may be incorporated in an amplifier. The following describes, as a third embodiment, a laser system including an amplifier in which the function of light intensity distribution conversion is incorporated.

4.1 Configuration

Figure 10:
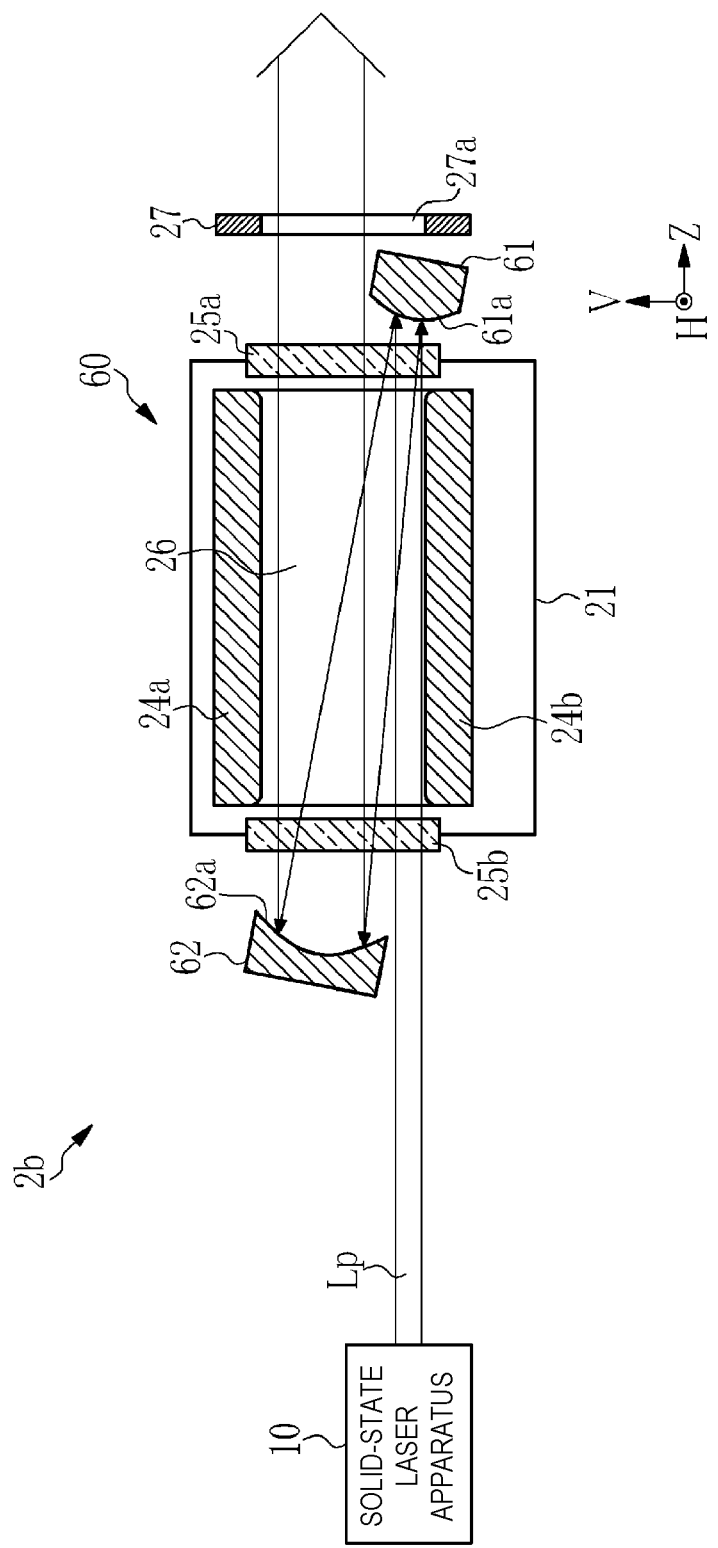
FIG. 10 is a diagram illustrating the entire configuration of a laser system according to a third embodiment.

FIG. 10 illustrates the entire configuration of a laser system 2b according to the third embodiment. The laser system 2b includes the solid-state laser apparatus 10 and an amplifier 60. The solid-state laser apparatus 10 has a configuration identical to that in the first embodiment.

The amplifier 60 includes a first aspherical mirror 61 and a second aspherical mirror 62 in place of the convex surface cylindrical mirror 22 and the concave surface cylindrical mirror 23. The chamber 21 and the slit 27 have configurations identical to those in the first embodiment.

The first aspherical mirror 61 includes a first asphere 61a. The second aspherical mirror 62 includes a second asphere 62a. A high reflection film (not illustrated) for the pulse laser beam Lp having a wavelength of 193.4 nm is formed on each of the first asphere 61a and the second asphere 62a. The first aspherical mirror 61 is disposed so that the pulse laser beam Lp output from the solid-state laser apparatus 10 and having passed through the second window 25b and the first window 25a is incident on the first asphere 61a. The second aspherical mirror 62 is disposed so that the pulse laser beam Lp highly reflected by the first asphere 61a and having passed through the first window 25a and the second window 25b is incident on the second asphere 62a.

The first aspherical mirror 61 and the second aspherical mirror 62 configure a pair of returning mirrors for returning the optical path of the pulse laser beam Lp. The first aspherical mirror 61 and the second aspherical mirror 62 are configured so that the pulse laser beam Lp incident on the amplifier 60 passes through the discharge space 26 three times and is output to the outside of the amplifier 60. The amplifier 60 is a multipath amplifier.

The first asphere 61a and the second asphere 62a each have shapes rotationally symmetric about the central axis and are disposed facing to each other. The surface shape of the first asphere 61a and the second asphere 62a is expressed by Expression (4) above. The central curvature, the Korenich constant, the aspherical coefficients, and the like are set for the first asphere 61a and the second asphere 62a so that the light intensity distribution of the pulse laser beam Lp incident thereon is converted from a Gaussian shape into a top hat shape.

The first aspherical mirror 61 has, for example, a rotationally symmetric convex shape and reflects the incident pulse laser beam Lp while expanding the beam diameter thereof in the V direction and the H direction. The second aspherical mirror 62 has, for example, a rotationally symmetric concave shape and is disposed so that reflected light of the pulse laser beam Lp collimates in the V direction and the H direction.

4.1.1 Designing Example

Figure 11:
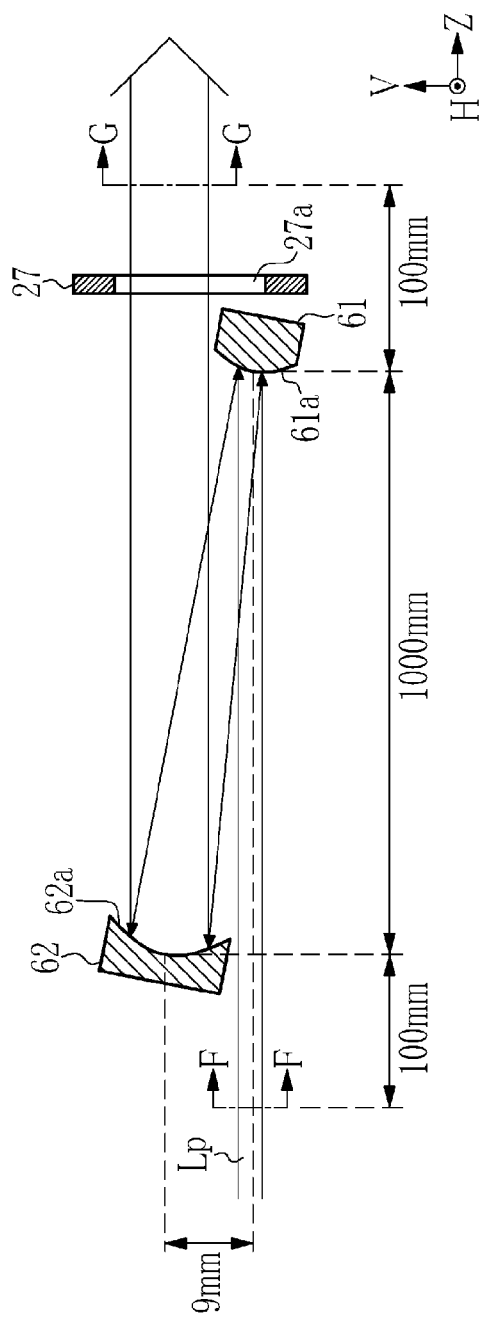
FIG. 11 is a diagram illustrating a designing example of first and second aspherical mirrors."

FIG. 11 and Table 2 indicate a designing example of the first aspherical mirror 61 and the second aspherical mirror 62. As illustrated in FIG. 11, the distance between the origins of the first aspherical mirror 61 and the second aspherical mirror 62 in the Z direction is 1000 mm, the distance between the origins in the V direction is 9 mm, and the distance between the origins in the H direction is 0 mm.

TABLE 2

| Surface | Central curvature (mm$^{-1}$) | Radius (mm) | Korenich constant | A | B | C | D |
|---|---|---|---|---|---|---|---|
| First aspherical mirror | $2.5 \times 10^{-3}$ | 5.00 | $-2.914 \times 10^5$ | $-2.985 \times 10^{-5}$ | $5.573 \times 10^{-6}$ | 0 | 0 |
| Second aspherical mirror | $-0.2399 \times 10^{-3}$ | 15.00 | $3.526 \times 10^6$ | $-3.289 \times 10^{-6}$ | $1.501 \times 10^{-8}$ | 0 | 0 |

Table 2 lists specific examples of the central curvature, the radius, the Korenich constant, and the aspherical coefficients of each of the first aspherical mirror 61 and the second aspherical mirror 62.

4.2 Operation

The following describes operation of the laser system 2a according to the third embodiment. The pulse laser beam Lp output from the solid-state laser apparatus 10 travels in the Z direction and is incident on the amplifier 60 as a seed beam. The light intensity distribution of the pulse laser beam Lp incident on the amplifier 60 at a beam section has a Gaussian shape that is rotationally symmetric about the Z axis as the optical path axis.

The pulse laser beam Lp incident on the amplifier 60 passes below the first aspherical mirror 61 and is incident in the discharge space 26. The pulse laser beam Lp incident in the discharge space 26 is amplified and then is incident on the first aspherical mirror 61. The pulse laser beam Lp incident on the first aspherical mirror 61 is highly reflected by the first asphere 61a and passes through the discharge space 26 while the beam diameter is expanded in the V direction and the H direction. Accordingly, the pulse laser beam Lp is further amplified and then is incident on the second aspherical mirror 62.

Figure 12:
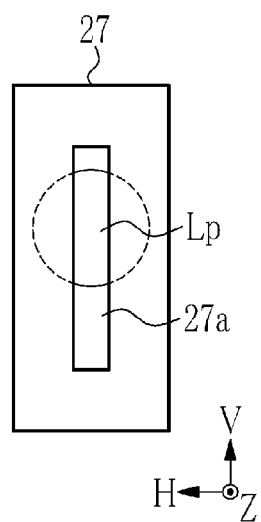
FIG. 12 is a diagram illustrating a pulse laser beam partially shielded by the slit.

The pulse laser beam Lp incident on the second aspherical mirror 62 is highly reflected by the second asphere 62a, and accordingly, the light intensity distribution thereof is converted from a Gaussian shape into a top hat shape. In addition, the pulse laser beam Lp is highly reflected by the second asphere 62a, and accordingly, is collimated in the V direction and the H direction and travels in the Z direction through the discharge space 26. The collimated pulse laser beam Lp is further amplified while passing through the discharge space 26, and passes above the first aspherical mirror 61, and then is incident on the slit 27. As illustrated in FIG. 12, a component of the pulse laser beam Lp incident on the slit 27 outside the opening 27a is shielded, and a component thereof having passed through the opening 27a is output to the outside of the laser system 2b.

Figure 13:
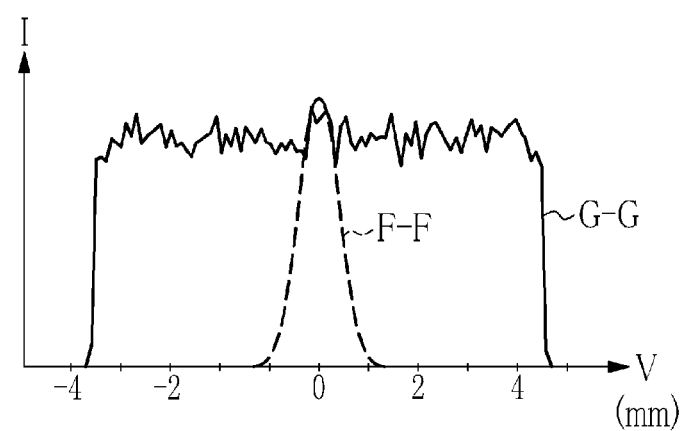
FIG. 13 is a graph illustrating a simulation result of light intensity distribution based on designed values indicated in FIG. 11 and Table 2.

FIG. 13 illustrates a simulation result of light intensity distribution based on the above-described designed values indicated in FIG. 11 and Table 2. The dashed line illustrates the light intensity distribution of the pulse laser beam Lp at a beam section along line F-F in FIG. 11. The solid line illustrates the light intensity distribution of the pulse laser beam Lp at a beam section along line G-G in FIG. 11.

4.3 Effect

In the third embodiment, the function of a conversion optical system configured to convert light intensity distribution from a Gaussian shape into a top hat shape is incorporated in the first aspherical mirror 61 and the second aspherical mirror 62 as a pair of returning mirrors included in the amplifier 60. Thus, in the third embodiment, no conversion optical system needs to be provided between the solid-state laser apparatus 10 and the amplifier 60.

In addition, in the third embodiment, the top-hat characteristics of the light intensity distribution of the pulse laser beam Lp, in other words, the top hat region ratio $R_{TOP}$ and the uniformity C can be improved by optimizing the central curvature, the Korenich constant, and the aspherical coefficients for each of the first aspherical mirror 61 and the second aspherical mirror 62.

5. Fourth Embodiment

In the laser system 2a according to the first embodiment, the gain distribution in the discharge space 26 is initially nonuniform in some cases, depending on the shapes of the first discharge electrode 24a and the second discharge electrode 24b. In addition, the maximum energy density of the pulse laser beam Lp output from the amplifier 20 potentially changes along with change of the gain distribution in the discharge space 26 due to degradation of the first discharge electrode 24a and the second discharge electrode 24b. For example, when the gain distribution is initially nonuniform, the light intensity distribution of the pulse laser beam Lp after amplification can be formed into a top hat shape in accordance with the gain distribution. Furthermore, as the maximum energy density increases along with change of the gain distribution, the amount of degradation of the first window 25a and the second window 25b increases in accordance with the amount of the increase. The following describes, as a fourth embodiment, a laser system that achieves stabilization of the maximum energy density of the pulse laser beam Lp output from the amplifier 20.

5.1 Configuration

Figure 14:
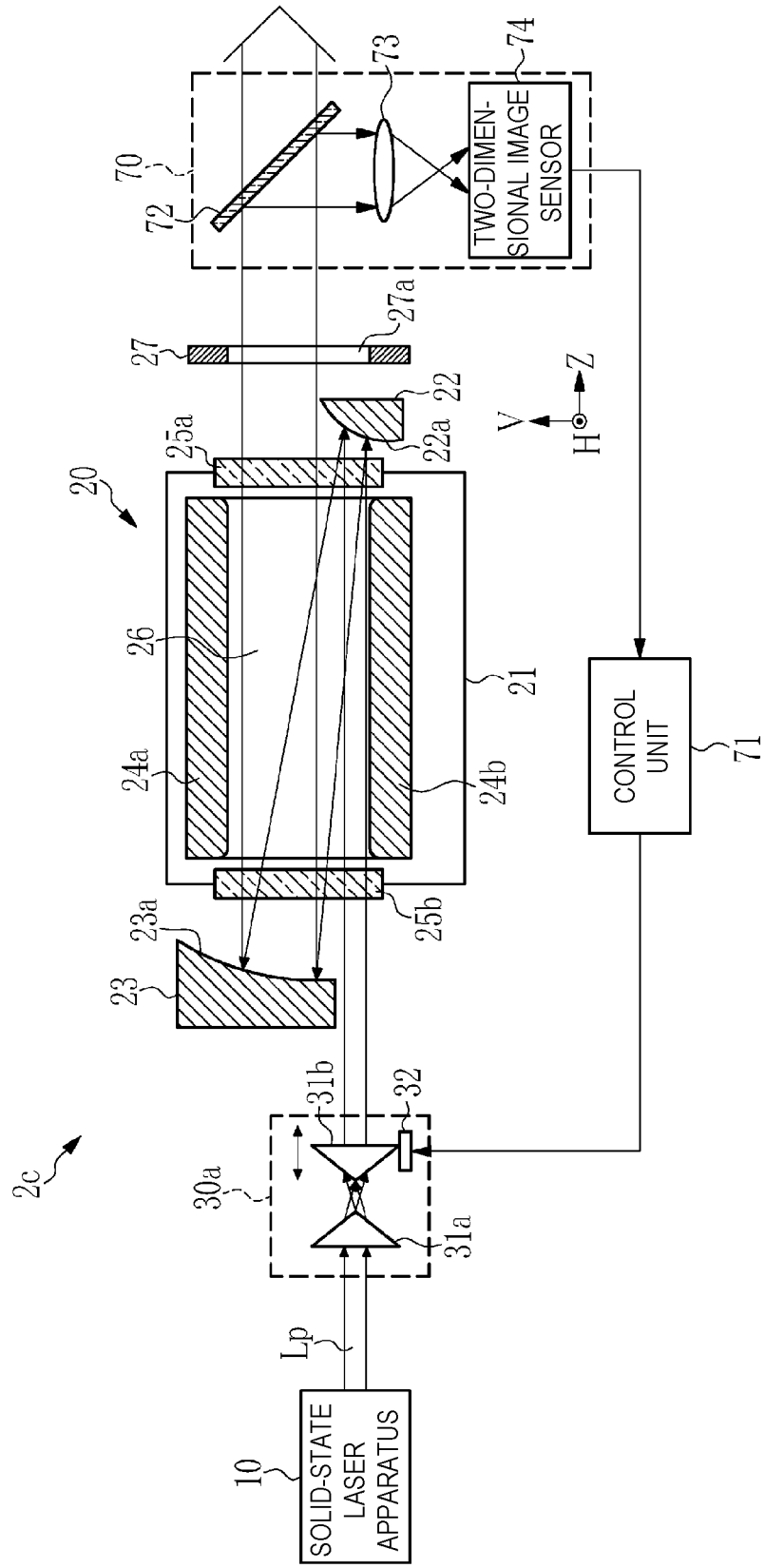
FIG. 14 is a diagram illustrating the entire configuration of a laser system according to a fourth embodiment.

FIG. 14 illustrates the entire configuration of a laser system 2c according to the fourth embodiment. The laser system 2c includes the solid-state laser apparatus 10, the amplifier 20, a conversion optical system 30a, a light intensity distribution measurement unit 70, and a control unit 71. The solid-state laser apparatus 10 and the amplifier 20 have configurations identical to those in the first embodiment.

The conversion optical system 30a includes the first axicon lens 31a, the second axicon lens 31b, and a linear stage 32. The first axicon lens 31a and the second axicon lens 31b have configurations identical to those in the first embodiment. In the present embodiment, the second axicon lens 31b is held by the linear stage 32 and can be reciprocated in the Z direction. The linear stage 32 is controlled by the control unit 71. The interval between the first axicon lens 31a and the second axicon lens 31b can be adjusted by controlling the linear stage 32 to change the position of the second axicon lens 31b.

The light intensity distribution measurement unit 70 includes a beam splitter 72, a transfer optical system 73, and a two-dimensional image sensor 74. The beam splitter 72 is disposed on the optical path of the pulse laser beam Lp output from the amplifier 20 and is tilted relative to the optical path. The transfer optical system 73 transfers, to the two-dimensional image sensor 74, part of the pulse laser beam Lp partially reflected by the beam splitter 72.

The two-dimensional image sensor 74 captures a transfer image transferred by the transfer optical system 73, and outputs two-dimensional image data to the control unit 71. The two-dimensional image data indicates the light intensity distribution of the pulse laser beam Lp output from the amplifier 20 at a VH section. The control unit 71 includes a control circuit configured to control the linear stage 32 based on the two-dimensional image data input from the two-dimensional image sensor 74.

5.2 Operation

The following describes operation of the laser system 2c according to the fourth embodiment. Similarly to the first embodiment, after being output from the solid-state laser apparatus 10, the pulse laser beam Lp is incident on the amplifier 20 through the conversion optical system 30a, amplified, and output from the amplifier 20. The pulse laser beam Lp output from the amplifier 20 is incident on the light intensity distribution measurement unit 70, and part thereof is reflected by the beam splitter 72 and incident on the transfer optical system 73. The partially reflected light incident on the transfer optical system 73 is transferred to the two-dimensional image sensor 74. The two-dimensional image sensor 74 captures a transfer image and outputs the captured transfer image to the control unit 71 as two-dimensional image data.

The control unit 71 adjusts the position of the second axicon lens 31b by controlling the linear stage 32 based on light intensity distribution expressed by the two-dimensional image data so that the maximum energy density of the pulse laser beam Lp output from the amplifier 20 is equal to or lower than a predetermined value.

5.3 Effect

In the fourth embodiment, the maximum energy density can be stabilized to the predetermined value or lower in accordance with the gain distribution in the discharge space 26 by adjusting the interval between the first axicon lens 31a and the second axicon lens 31b based on a measured value of the light intensity distribution of the pulse laser beam Lp output from the amplifier 20. Accordingly, degradation of windows or the like of the amplifier 20 can be reduced.

In the fourth embodiment, the position of the second axicon lens 31b is controlled by the linear stage 32, but the position of the first axicon lens 31a or the positions of the first axicon lens 31a and the second axicon lens 31b may be controlled.

In addition, in the fourth embodiment, the linear stage 32 is controlled based on the maximum energy density of the pulse laser beam Lp output from the amplifier 20, but the linear stage 32 may be controlled based on pulse energy in addition to the maximum energy density. In this case, the control unit 71 calculates the maximum energy density and the pulse energy based on the two-dimensional image data input from the two-dimensional image sensor 74. For example, the control unit 71 controls the linear stage 32 so that the maximum energy density is equal to or lower than a predetermined value and the pulse energy is in a predetermined range. Accordingly, the maximum energy density can be stabilized to the predetermined value or lower while the amplification efficiency of the amplifier 20 is maintained.

5.4 Modification of Conversion Optical System

The following describes a modification of the conversion optical system. In the fourth embodiment, the conversion optical system configured to convert light intensity distribution from a Gaussian shape into a top hat shape includes a combination of two axicon lenses, but the conversion optical system is not limited to this configuration.

5.4.1 Configuration

Figure 15A:
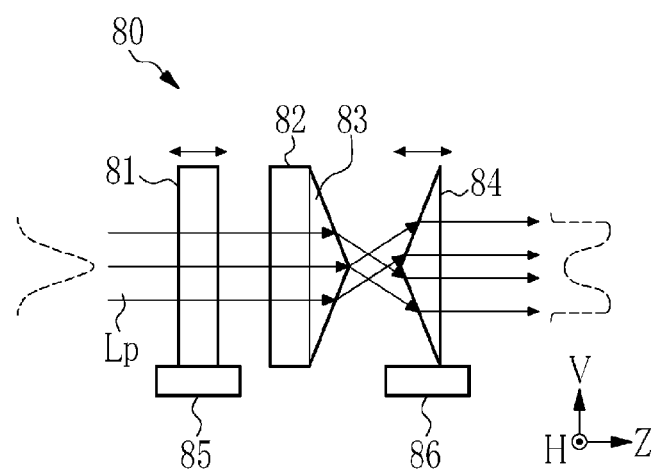
FIGS. 15A and 15B are diagrams illustrating a conversion optical system according to a modification.
Figure 15B:
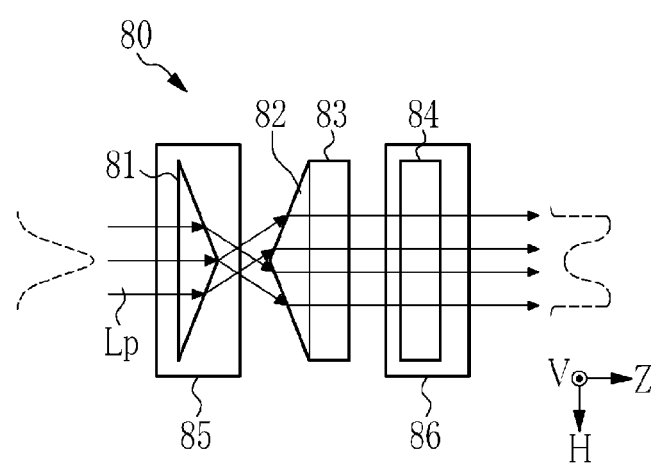

FIGS. 15A and 15B illustrate a conversion optical system 80 according to the modification. The conversion optical system 80 is used in place of the conversion optical system 30a of the fourth embodiment. The conversion optical system 80 includes a first prism 81, a second prism 82, a third prism 83, a fourth prism 84, a first linear stage 85, and a second linear stage 86.

The first prism 81 and the second prism 82 each have an isosceles triangular section along an HZ plane parallel to the optical path axis and orthogonal to the discharge direction. The first prism 81 and the second prism 82 are disposed so that isosceles triangular sections thereof along an HZ plane parallel to the optical path axis and the discharge direction have equal angles at each apex and each pair of corresponding apexes face to each other in the Z direction. The third prism 83 and the fourth prism 84 each have an isosceles triangular section parallel to a VZ plane. The third prism 83 and the fourth prism 84 are disposed so that isosceles triangular sections parallel to a VZ plane have equal angles at each apex and each pair of corresponding apexes face to each other in the Z direction. The second prism 82 and the third prism 83 are joined and fixed to each other while flat surfaces thereof contact each other. The second prism 82 and the third prism 83 may be integrally formed.

The first prism 81 is held by the first linear stage 85 and can be reciprocated in the Z direction. The fourth prism 84 is held by the second linear stage 86 and can be reciprocated in the Z direction. The first linear stage 85 and the second linear stage 86 are controlled by the control unit 71. The control unit 71 can adjust the interval between the first prism 81 and the second prism 82 by controlling the first linear stage 85 to change the position of the first prism 81. In addition, the control unit 71 can adjust the interval between the third prism 83 and the fourth prism 84 by controlling the second linear stage 86 to change the position of the fourth prism 84. The positions of the first prism 81 and the fourth prism 84 are adjusted in advance to decrease the maximum energy density of the pulse laser beam Lp output from the amplifier 20.

5.4.2 Operation

The pulse laser beam Lp output from the solid-state laser apparatus 10 is incident on the first prism 81 of the conversion optical system 80. Of the pulse laser beam Lp incident on the first prism 81, part on the positive side of the central axis in the H direction refracts and travels toward the negative side, and part on the negative side of the central axis in the H direction refracts and travels toward the positive side. For example, this travel distance is larger than the half width at half maximum of the light intensity distribution. As these light parts transmit through the second prism 82, the light intensity distribution of the pulse laser beam Lp becomes a double-peak shape having a recess of low light intensity at a central part in the H direction and having peaks of high light intensity at both ends of the recess.

The pulse laser beam Lp having transmitted through the second prism 82 is incident on the third prism 83. Of the pulse laser beam Lp incident on the third prism 83, part on the positive side of the central axis in the V direction refracts and travels towards the negative side, and part on the negative side of the central axis in the V direction refracts and travels toward the positive side. As these light parts transmit through the fourth prism 84, the light intensity distribution of the pulse laser beam Lp becomes a double-peak shape having a recess of low light intensity at a central part in the V direction and having peaks of high light intensity at both ends of the recess.

Figure 16A:
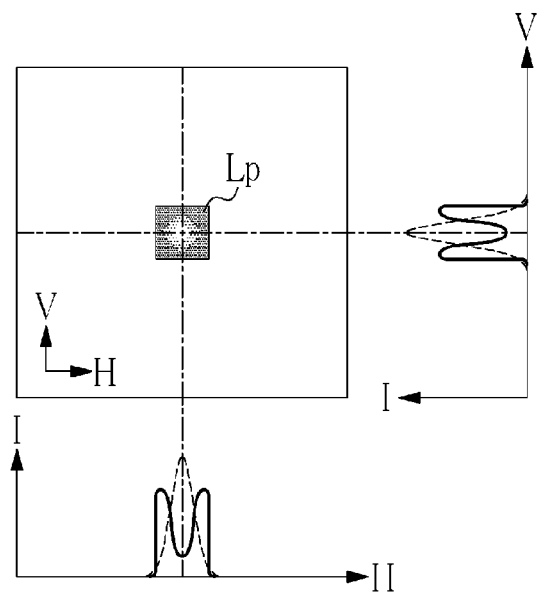
FIG. 16A is a diagram illustrating the light intensity distribution of a pulse laser beam incident on the conversion optical system.

In this manner, as illustrated in FIG. 16A, the light intensity distribution of the pulse laser beam Lp incident on the conversion optical system 80 is converted from a Gaussian shape into a double-peak shape in each of the H direction and the V direction, and then the pulse laser beam Lp is output. The pulse laser beam Lp output from the conversion optical system 80 is incident on the amplifier 20 as a seed beam. Then, while passing through the discharge space 26, the pulse laser beam Lp is amplified and the beam diameter thereof is expanded in the V direction as the discharge direction.

Figure 16B:
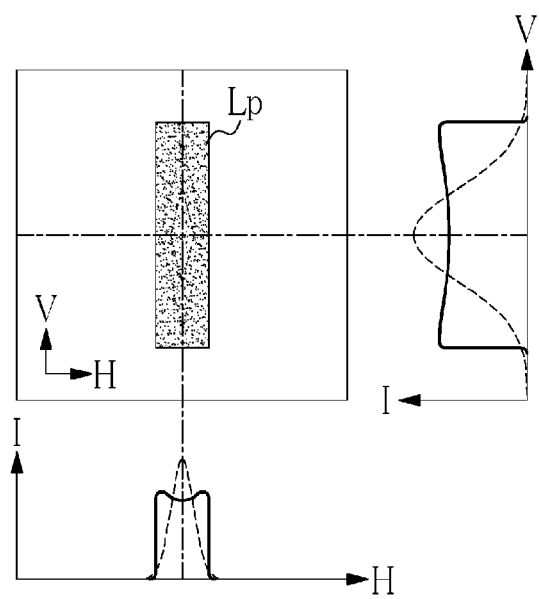
FIG. 16B is a diagram illustrating the light intensity distribution of a pulse laser beam output from the amplifier.

Typically, the gain at a central part of the discharge space 26 potentially becomes high through the amplifier 20. As a result, as illustrated in FIG. 16B, the light intensity is higher than that illustrated in FIG. 16A at a central part in the light intensity distribution of the pulse laser beam Lp output from the amplifier 20, and has a top hat shape slightly recessed at the central part in the H direction and the V direction.

5.4.3 Effect

In the present modification, the shape of light intensity distribution can be adjusted in each of the H direction and the V direction by adjusting each of the positions of the first prism 81 and the fourth prism 84. Accordingly, the maximum energy density can be reduced by adjusting the shape of light intensity distribution in accordance with the gain distribution in the discharge space 26 of the amplifier 20 and change in the gain distribution.

In addition, similarly to the fourth embodiment, the control unit 71 may control the first linear stage 85 and the second linear stage 86 based on the two-dimensional image data input from the two-dimensional image sensor 74 included in the light intensity distribution measurement unit 70.

In the present modification, the first prism 81 and the fourth prism 84 are moved, but prisms to be moved are not limited to these prisms. Any one or both of the first prism 81 and the second prism 82, and any one or both of the third prism 83 and the fourth prism 84 may be moved.

In addition, in the fourth embodiment as well, the interval between the first axicon lens 31a and the second axicon lens 31b may be adjusted so that the light intensity distribution of the pulse laser beam Lp incident on the amplifier 20 at a VH section decreases at a central part.

6. Fifth Embodiment

Figure 17A:
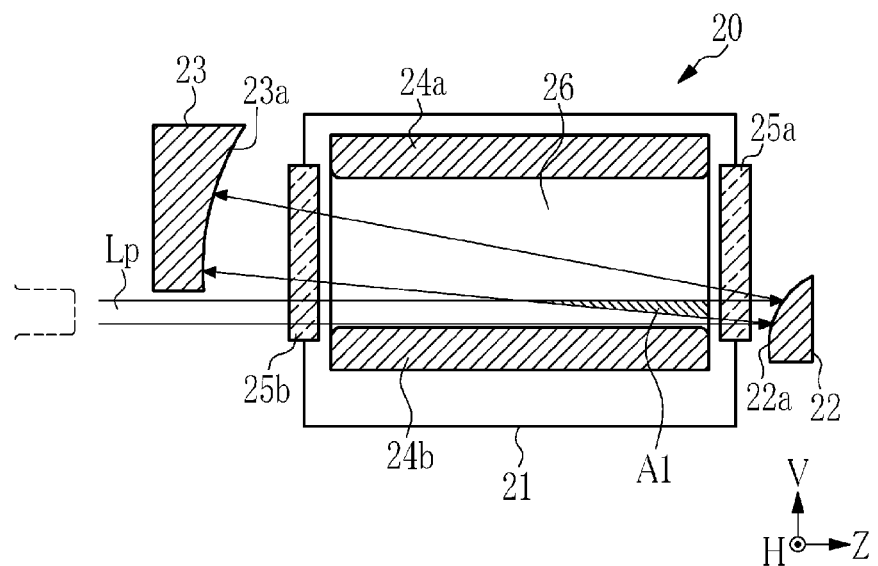
FIGS. 17A and 17B are diagrams for description of a problem with a multipath amplifier.
Figure 17B:
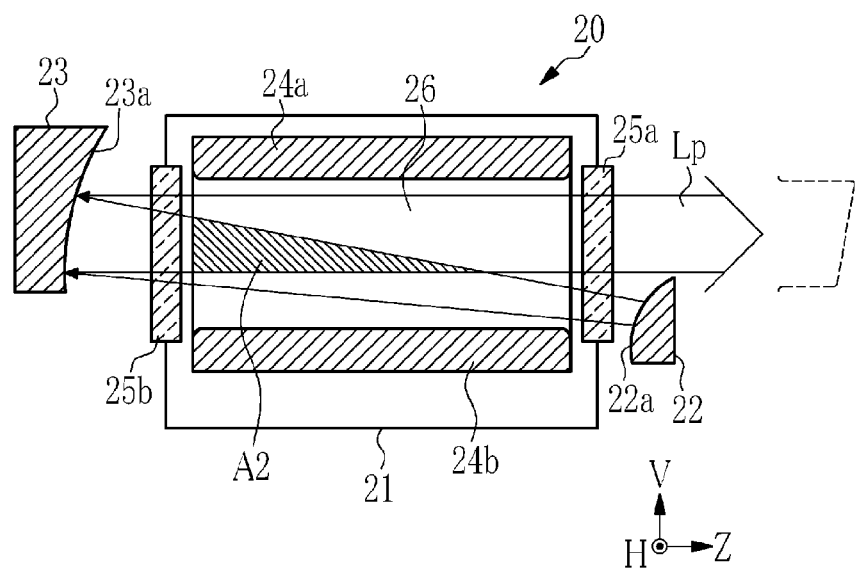

In the above-described embodiments, since the amplifier is a multipath amplifier including a returning optical path, imbalance of the amplification factor potentially occurs in the V direction. FIGS. 17A and 17B illustrate a process through which imbalance of the amplification factor occurs in the V direction. The pulse laser beam Lp incident on the amplifier is amplified by consuming inverted distribution generated in the discharge space, in other words, gain. As illustrated in FIG. 17A, the pulse laser beam Lp incident in the discharge space 26 of the amplifier 20 is amplified by consuming gain at a lower part of the discharge space 26 in the V direction and then is incident on the convex surface cylindrical mirror 22.

The pulse laser beam Lp reflected by the convex surface cylindrical mirror 22 is incident in the discharge space 26 and further amplified by consuming gain, and then is incident on the concave surface cylindrical mirror 23. Gain is already consumed in Region A1 in which an incident light path to and a reflected light path from the convex surface cylindrical mirror 22 overlap with each other, and thus the amplification factor for the pulse laser beam Lp reflected by the convex surface cylindrical mirror 22 is lower at a lower position in the V direction.

As illustrated in FIG. 17B, the pulse laser beam Lp reflected by the concave surface cylindrical mirror 23 is amplified by consuming gain at an upper part of the discharge space 26 in the V direction, and is output from the amplifier 20. Gain is already consumed in Region A2 in which an incident light path to and a reflected light path from the concave surface cylindrical mirror 23 overlap with each other, and thus the amplification factor for the pulse laser beam Lp reflected by the concave surface cylindrical mirror 23 is lower at a lower position in the V direction.

Accordingly, when the pulse laser beam Lp having light intensity distribution in a top hat shape is incident on the amplifier 20, the light intensity is lower at a lower position in the V direction in the light intensity distribution of the pulse laser beam Lp output from the amplifier 20, and imbalance potentially occurs. The following describes, as a fifth embodiment, a laser system that can reduce the imbalance of the light intensity distribution attributable to the returning optical path.

6.1 Configuration

Figure 18:
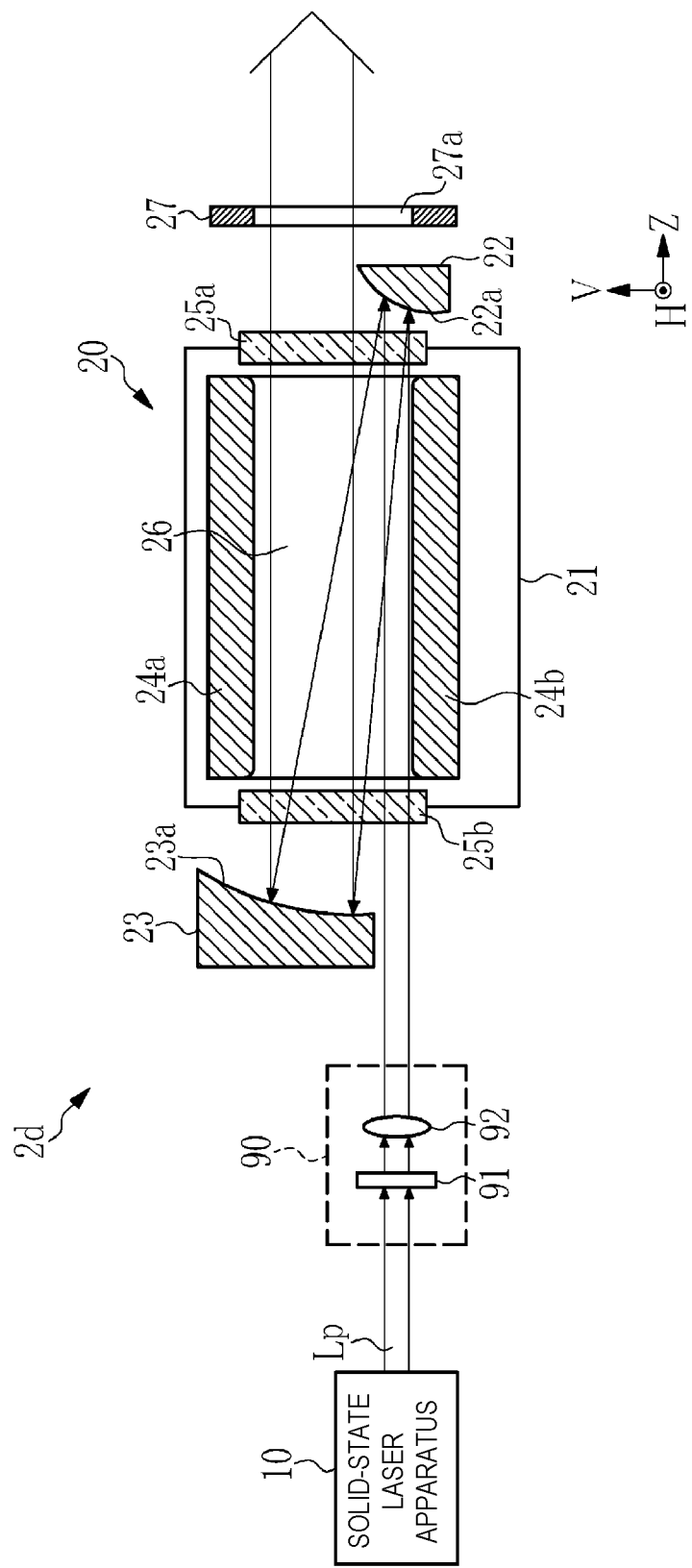
FIG. 18 is a diagram illustrating the entire configuration of a laser system according to a fifth embodiment.

FIG. 18 illustrates the entire configuration of a laser system 2d according to the fifth embodiment. The laser system 2d includes the solid-state laser apparatus 10, the amplifier 20, and a conversion optical system 90. The solid-state laser apparatus 10 and the amplifier 20 have configurations identical to those in the first embodiment.

The conversion optical system 90 includes a phase filter 91 as a spatial light phase modulation element, and a light condensation lens 92 as a Fourier transform element. The conversion optical system 90 is disposed on the optical path between the solid-state laser apparatus 10 and the amplifier 20. The phase filter 91 is disposed on the solid-state laser apparatus 10 side of the light condensation lens 92. The light condensation lens 92 is disposed so that the central axis thereof is aligned with the pulse laser beam Lp. The light condensation lens 92 is also disposed so that, for example, the focal point thereof is positioned at the first window 25a. With this configuration, the light condensation lens 92 condenses the pulse laser beam Lp incident thereon as parallel light and images the pulse laser beam Lp on a focal plane.

The light condensation lens 92 has an optical Fourier transform effect. Specifically, complex amplitude distribution at the focal plane of the light condensation lens 92 is two-dimensional Fourier transform of complex amplitude distribution included in the pulse laser beam Lp incident on the light condensation lens 92. Thus, electric field amplitude, in other words, light intensity at the focal plane can be converted by modulating the phase of the pulse laser beam Lp incident on the light condensation lens 92.

Figure 19:
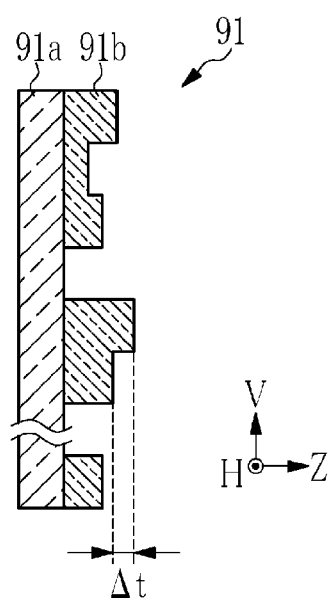
FIG. 19 is a diagram illustrating the configuration of a phase filter.

The phase filter 91 spatially modulates, at a VH plane, the phase of the pulse laser beam Lp incident on the light condensation lens 92. As illustrated in FIG. 19, the phase filter 91 includes a plane substrate 91a, and a dielectric film 91b formed on the plane substrate 91a. The dielectric film 91b may be a multi-layered film. The plane substrate 91a is formed of, for example, $CaF_2$ crystal, which is highly durable for an ultraviolet laser beam. The plane substrate 91*a* is disposed in parallel to a VH plane.

The dielectric film 91*b* is formed on the surface of the plane substrate 91*a* by evaporation coating and has two-dimensional phase distribution formed by etching processing. The dielectric film 91*b* provides a spatially different phase difference to the pulse laser beam Lp due to a difference Δt in the mechanical thickness in the Z direction. When λ represents the wavelength of the pulse laser beam Lp and n represents the refractive index of the dielectric film 91*b*, a phase difference Δφ for the mechanical thickness difference Δt is expressed by Expression (5) below.

$$\Delta\phi = n\Delta t/\lambda \quad (5)$$

6.2 Operation

Figure 20:
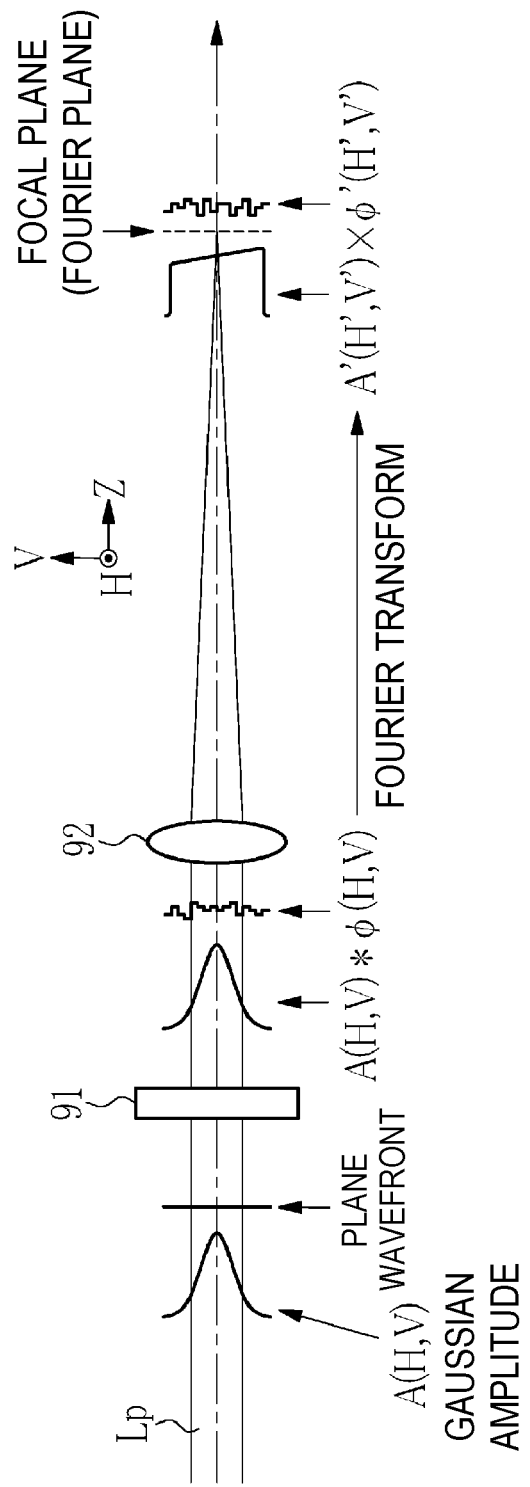
FIG. 20 is a diagram illustrating the principle of conversion of light intensity distribution through phase modulation by the phase filter.

FIG. 20 illustrates the principle of conversion of the light intensity distribution of the pulse laser beam Lp incident on the conversion optical system 90 as plane wave through phase modulation by the phase filter 91. The pulse laser beam Lp output from the solid-state laser apparatus 10 is highly coherent and incident on the phase filter 91 as plane wave. The pulse laser beam Lp has Gaussian amplitude A(H, V). In other words, the light intensity distribution expressed in the square of the amplitude has a Gaussian shape.

The phase of the pulse laser beam Lp incident on the phase filter 91 is spatially modulated as the pulse laser beam Lp transmits through the phase filter 91. The phase of the pulse laser beam Lp having transmitted through the phase filter 91 receives reflection of the phase distribution formed on the phase filter 91 and becomes φ(H, V). For example, the complex amplitude distribution of the pulse laser beam Lp incident on the light condensation lens 92 is expressed by convolution integral of the amplitude A(H, V) and the phase φ(H, V). In this case, the complex amplitude distribution of the pulse laser beam Lp at the focal plane of the light condensation lens 92 is the product of functions of the amplitude A(H, V) and the phase φ(H, V) each subjected to Fourier transform. The function A'(H', V') is a function of A(H, V) subjected to Fourier transform. The function φ'(H', V') is a function of φ(H, V) subjected to Fourier transform. The variables H' and V' are spatial frequencies and have dimensions reciprocal of H and V length units, respectively.

Figure 21:
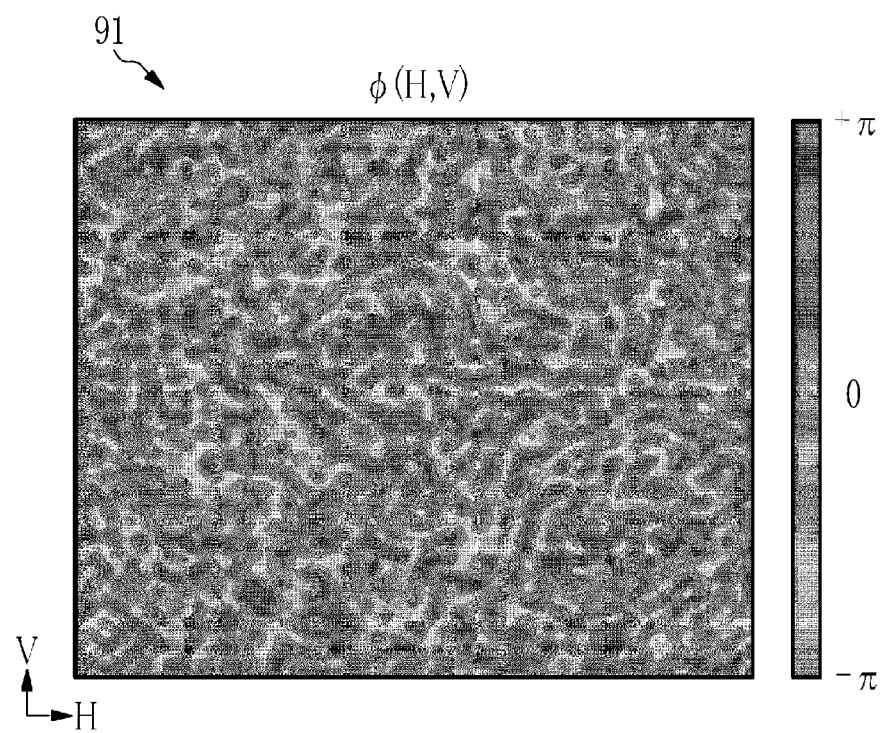
FIG. 21 is a diagram illustrating exemplary phase distribution formed at the phase filter.

In the present embodiment, the phase distribution of the phase filter 91 is formed so that the light intensity distribution corresponding to the amplitude A'(H', V') has a shape in which the light intensity monotonically increases from a top hat shape with position toward the negative side in the V direction. The light intensity distribution having a shape in which the light intensity is modulated in this manner reduces the imbalance of the light intensity distribution attributable to the returning optical path of the amplifier 20. FIG. 21 illustrates exemplary phase distribution formed on the phase filter 91.

6.3 Effect

In the fifth embodiment, the light intensity distribution of the pulse laser beam Lp output from the solid-state laser apparatus 10 is converted by subjecting the pulse laser beam Lp to phase modulation through the phase filter 91 and to optical Fourier transform through the light condensation lens 92. Through designing of the phase distribution of the phase filter 91, the converted light intensity distribution can have a shape in which the light intensity monotonically increases from a top hat shape with position toward the negative side in the V direction. At the amplifier 20 including the returning optical path, the amplification factor decreases with position toward the negative side in the V direction. Thus, the imbalance of the light intensity distribution of the pulse laser beam Lp output from the amplifier 20 can be reduced by causing the pulse laser beam Lp, the light intensity distribution of which has a top hat shape modulated as described above to be incident on the amplifier 20.

In the fifth embodiment, the phase filter 91 illustrated in FIG. 19 is used as the spatial light phase modulation element, but instead, a spatial light phase modulation element that can optionally change phase distribution by a diffraction grating or an electric signal may be used. In addition, the phase filter 91 is transmissive, but a reflective spatial light phase modulation element may be used. For example, a liquid-crystal-on-silicon spatial light modulator (LCOS-SLM) is known as the reflective spatial light phase modulation element. Alternatively, a digital mirror device that can cause reflection in a plurality of directions by controlling each of the angles of a plurality of micro mirrors may be used as a reflective spatial light phase modulation element usable in a wavelength of 193 nm.

7. Specific Example of Solid-State Laser Apparatus

The following describes a specific example of the solid-state laser apparatus 10.

7.1 Configuration

Figure 22:
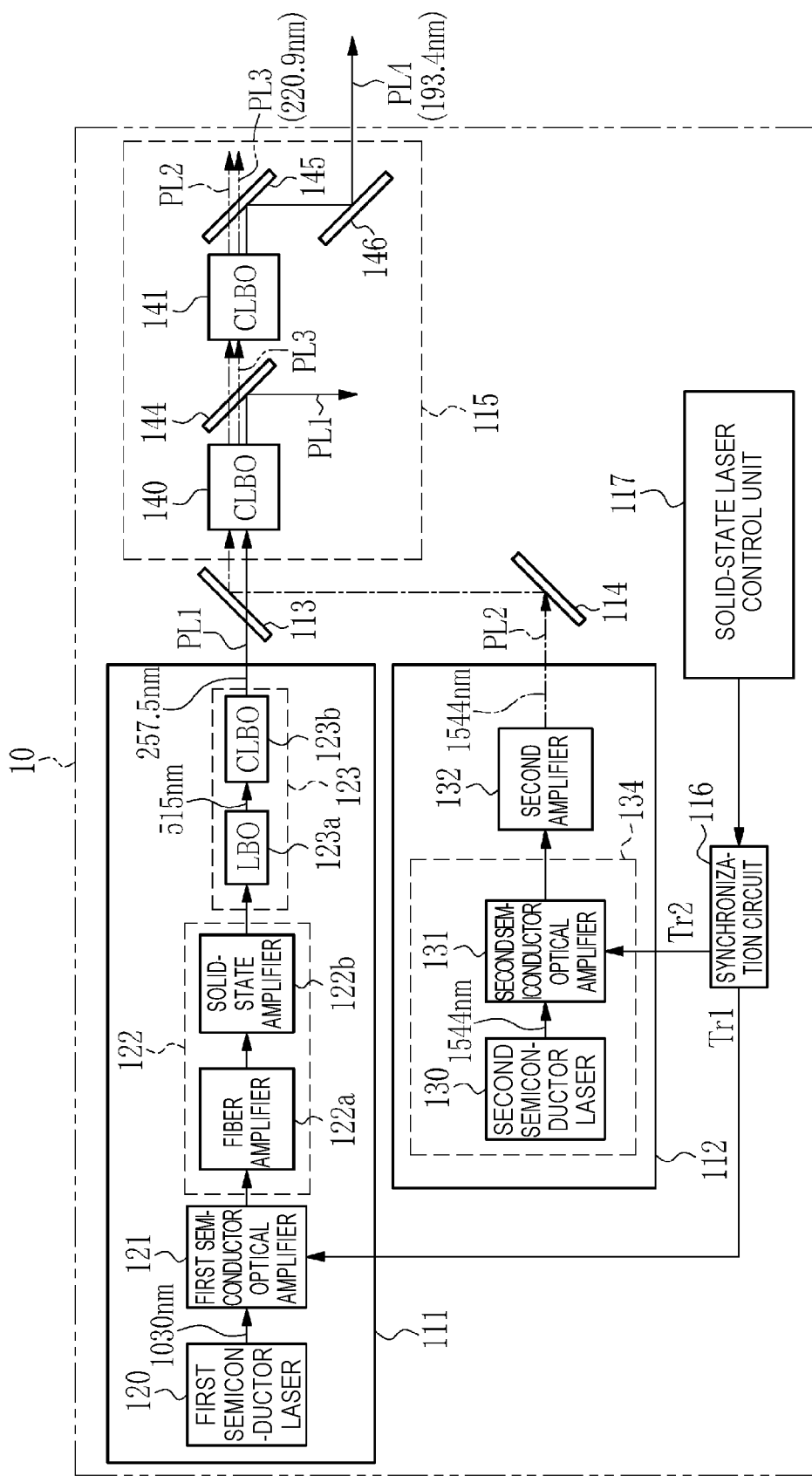
FIG. 22 is a diagram illustrating the configuration of a solid-state laser apparatus.

FIG. 22 illustrates the configuration of the solid-state laser apparatus 10. The solid-state laser apparatus 10 includes a first solid-state laser apparatus 111, a second solid-state laser apparatus 112, a dichroic mirror 113, a high reflectance mirror 114, a wavelength conversion system 115, a synchronization circuit 116, and a solid-state laser control unit 117.

The first solid-state laser apparatus 111 includes a first semiconductor laser 120, a first semiconductor optical amplifier 121, a first amplifier 122, and a wavelength conversion unit 123. The first amplifier 122 includes a fiber amplifier 122*a*, a solid-state amplifier 122*b*, and a CW excitation semiconductor laser (not illustrated). The wavelength conversion unit 123 includes an LBO crystal 123*a* and a CLBO crystal 123*b*.

The first semiconductor laser 120 outputs a CW laser beam having a wavelength of 1030 nm approximately as a first seed beam in a single longitudinal mode. The first semiconductor laser 120 is, for example, a distributed-feedback semiconductor laser. The first semiconductor optical amplifier 121 generates a laser beam having a predetermined pulse width by performing pulse amplification on the first seed beam. Hereinafter, the laser beam generated by the first semiconductor optical amplifier 121 is referred to as first seed pulse light.

In the fiber amplifier 122*a*, a plurality of quartz fibers doped with Yb are connected with each other at multiple stages. The solid-state amplifier 122*b* is a YAG crystal doped with Yb. The fiber amplifier 122*a* and the solid-state amplifier 122*b* are optically excited by CW excitation light input from the CW excitation semiconductor laser (not illustrated). The first amplifier 122 amplifies the first seed pulse light incident from the first semiconductor optical amplifier 121.

The wavelength conversion unit 123 performs wavelength conversion on the first seed pulse light amplified by the first amplifier 122, and outputs the first seed pulse light as a first pulse laser beam PL1. Specifically, the wavelength conversion unit 123 including the LBO crystal 123*a* and the CLBO crystal 123*b* generates, from the first seed pulse light, fourth harmonic light having a wavelength of 257.5 nm approximately, and outputs the fourth harmonic light as the first pulse laser beam PL1.

The second solid-state laser apparatus 112 includes a second semiconductor laser 130, a second semiconductor optical amplifier 131, and a second amplifier 132. The second amplifier 132 includes an Er fiber amplifier (not illustrated) in which a plurality of quartz fibers doped with Er and Yb are connected with each other at multiple stages, and a CW excitation semiconductor laser (not illustrated).

The second semiconductor laser 130 outputs a CW laser beam having a wavelength of 1554 nm approximately as a second seed beam in a single longitudinal mode. The second semiconductor laser 130 is, for example, a distributed-feedback semiconductor laser. The second semiconductor optical amplifier 131 generates a laser beam having a predetermined pulse width by performing pulse amplification on the second seed beam. Hereinafter, the laser beam generated by the second semiconductor optical amplifier 131 is referred to as second seed pulse light.

The Er fiber amplifier included in the second amplifier 132 is optically excited by CW excitation light input from the CW excitation semiconductor laser (not illustrated). The second amplifier 132 amplifies the second seed pulse light incident from the second semiconductor optical amplifier 131, and outputs the second seed pulse light as a second pulse laser beam PL2.

The dichroic mirror 113 is disposed at a position where the first pulse laser beam PL1 output from the first solid-state laser apparatus 111 is incident. The high reflectance mirror 114 is disposed to highly reflect the second pulse laser beam PL2 output from the second solid-state laser apparatus 112 so that the highly reflected second pulse laser beam PL2 is incident on the dichroic mirror 113.

The dichroic mirror 113 is coated with a film that highly transmits the first pulse laser beam PL1 having a wavelength of 257.5 nm approximately and highly reflects the second pulse laser beam PL2 having a wavelength of 1554 nm approximately. The dichroic mirror 113 is disposed so that the optical path axis of the highly transmitted first pulse laser beam PL1 and the optical path axis of the highly reflected second pulse laser beam PL2 are aligned with each other.

The wavelength conversion system 115 includes a first CLBO crystal 140, a second CLBO crystal 141, a first dichroic mirror 144, a second dichroic mirror 145, and a high reflectance mirror 146. The first CLBO crystal 140, the first dichroic mirror 144, the second CLBO crystal 141, and the second dichroic mirror 145 are disposed in the stated order on the optical paths of the first second pulse laser beams PL1 and PL2. The first second pulse laser beams PL1 and PL2 are incident on the first CLBO crystal 140.

The first CLBO crystal 140, where the first second pulse laser beams PL1 and PL2 overlap with each other, generates a third pulse laser beam PL3 having a wavelength of 220.9 nm approximately corresponding to the sum frequency of the wavelength of 257.5 nm approximately and the wavelength of 1554 nm approximately. The first and second pulse laser beams PL1 and PL2 not provided with wavelength conversion transmit through the first CLBO crystal 140.

The first dichroic mirror 144 is coated with a film that highly reflects the first pulse laser beam PL1 and highly transmits the second third pulse laser beams PL2 and PL3. The second and third pulse laser beams PL2 and PL3 having highly transmitted through the first dichroic mirror 144 are incident on the second CLBO crystal 141.

The second CLBO crystal 141, where the second third pulse laser beams PL2 and PL3 overlap with each other, generates a fourth pulse laser beam PL4 having a wavelength of 193.4 nm approximately corresponding to the sum frequency of the wavelength of 1554 nm approximately and the wavelength of 220.9 nm approximately. The second and third pulse laser beams PL2 and PL3 not provided with wavelength conversion transmit through the second CLBO crystal 141.

The second dichroic mirror 145 is coated with a film that highly reflects the fourth pulse laser beam PL4 and highly transmits the second and third pulse laser beams PL2 and PL3. The high reflectance mirror 146 is disposed at a position where the fourth pulse laser beam PL4 highly reflected by the second dichroic mirror 145 is highly reflected and output from the wavelength conversion system 115. The fourth pulse laser beam PL4 corresponds to the pulse laser beam Lp described above.

7.2 Operation

The synchronization circuit 116 generates a first internal trigger signal Tr1 and a second internal trigger signal Tr2 in accordance with inputting of an oscillation trigger signal from the solid-state laser control unit 117. The first internal trigger signal Tr1 generated by the synchronization circuit 116 is input to the first semiconductor optical amplifier 121, and the second internal trigger signal Tr2 generated by the synchronization circuit 116 is input to the second semiconductor optical amplifier 131. The first semiconductor optical amplifier 121 outputs the first seed pulse light in accordance with the inputting of the first internal trigger signal Tr1. The second semiconductor optical amplifier 131 outputs the second seed pulse light in accordance with the inputting of the second internal trigger signal Tr2.

The synchronization circuit 116 adjusts the timings of the first internal trigger signal Tr1 and the second internal trigger signal Tr2 so that the first pulse laser beam PL1 temporally overlaps with the second pulse laser beam PL2 in the wavelength conversion system 115. As a result, the pulse laser beam Lp having a wavelength of 193.4 nm approximately is output from the solid-state laser apparatus 10.

The solid-state laser apparatus 10 generates and outputs sum frequency light of output light from the first solid-state laser apparatus 111 and output light from the second solid-state laser apparatus 112, and can output the ultraviolet pulse laser beam Lp at high intensity.

8. Modification of Amplifier

The following describes a modification of the amplifier. In the above-described embodiments, the amplifier is a multipath amplifier but the amplifier is not limited to this configuration.

8.1 Configuration

Figure 23:
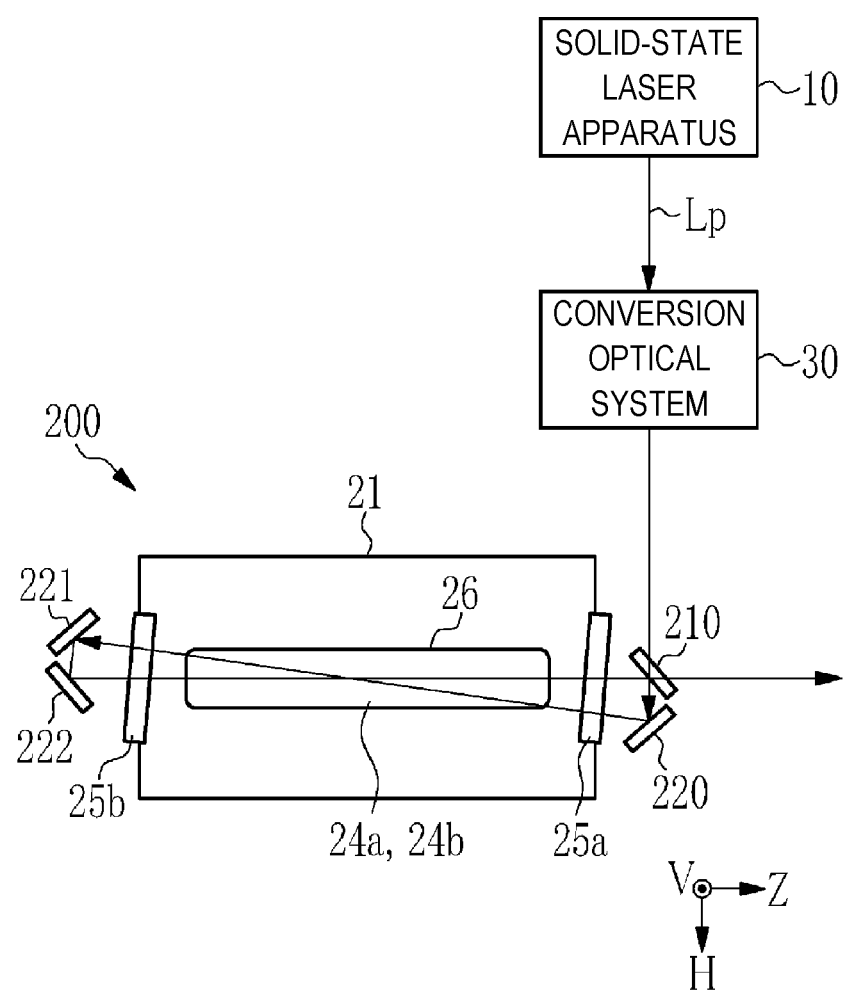
FIG. 23 is a diagram illustrating the configuration of an amplifier according to a modification.

FIG. 23 illustrates the configuration of an amplifier 200 according to the modification. The amplifier 200 includes the chamber 21, an output coupling mirror 210, and high reflectance mirrors 220 to 222. The high reflectance mirrors 220 to 222 are planar mirrors. The chamber 21 has a configuration identical to that in the first embodiment. The output coupling mirror 210 and the high reflectance mirrors 220 to 222 configure a ring resonator. The ring resonator forms two optical paths intersecting with each other in the discharge space 26 of the chamber 21. The optical paths formed by the ring resonator are substantially parallel to an HZ plane orthogonal to the discharge direction. The output coupling mirror 210 is, for example, a partially reflective mirror having a reflectance of 20% to 40%.

The solid-state laser apparatus 10 and the conversion optical system 30 are disposed so that the pulse laser beam Lp that is output from the solid-state laser apparatus 10 and the light intensity distribution of which is converted by the conversion optical system 30 is incident on the output coupling mirror 210. The conversion optical system of the present embodiment is not limited to the conversion optical system 30 according to the first embodiment, but may be the conversion optical system having the configuration illustrated in FIG. 7 or 9.

When the gap between the first discharge electrode 24a and the second discharge electrode 24b is larger than the discharge width of the electrodes, a beam expander (not illustrated) may be disposed on the optical path between the conversion optical system 30 and the amplifier 200. The beam expander includes, for example, a cylindrical concave lens and a cylindrical convex lens and expands the beam diameter of the pulse laser beam Lp in the V direction.

8.2 Operation

Part of the pulse laser beam Lp incident on the output coupling mirror 210 from the conversion optical system 30 transmits through the output coupling mirror 210 and is highly reflected by the high reflectance mirror 220. The pulse laser beam Lp highly reflected by the high reflectance mirror 220 is incident in the discharge space 26 through the first window 25a. The pulse laser beam Lp incident in the discharge space 26 travels and is amplified along an optical path tilted relative to the Z direction as the longitudinal direction of the first and second discharge electrodes 24a and 24b. The amplified pulse laser beam Lp is output from the chamber 21 through the second window 25b.

The pulse laser beam Lp output from the chamber 21 is highly reflected by the high reflectance mirrors 221 and 222 and is incident in the discharge space 26 through the second window 25b. The pulse laser beam Lp incident in the discharge space 26 travels and is amplified along an optical path substantially parallel to the Z direction. The amplified pulse laser beam Lp is output from the chamber 21 through the first window 25a and is incident on the output coupling mirror 210.

Among the pulse laser beam Lp incident on the output coupling mirror 210, light having transmitted through the output coupling mirror 210 is output to the exposure apparatus. Among the pulse laser beam Lp incident on the output coupling mirror 210, light reflected by the output coupling mirror 210 travels through the optical path of the ring resonator again. Through repetition of the above-described operation, amplified oscillation occurs and a plurality of amplified pulse laser beams are incident on the exposure apparatus.

The above description is intended to provide not restriction but examples. Thus, the skilled person in the art would clearly understand that the embodiments of the present disclosure may be changed without departing from the scope of the claims.

The terms used throughout the specification and the appended claims should be interpreted as "non-limiting". For example, the term "comprising" or "comprised" should be interpreted as "not limited to what has been described as being comprised". The term "having" should be interpreted as "not limited to what has been described as being had". Further, the modifier "a/an" described in the specification and the appended claims should be interpreted to mean "at least one" or "one or more".

What is claimed is:

1. A laser system comprising:
  A. a solid-state laser apparatus configured to output a pulse laser beam having light intensity distribution in a Gaussian shape that is rotationally symmetric about an optical path axis;
  B. an amplifier including a pair of discharge electrodes and configured to amplify the pulse laser beam in a discharge space between the pair of discharge electrodes; and
  C. a conversion optical system configured to convert the light intensity distribution of the pulse laser beam output from the amplifier into a top hat shape in each of a discharge direction of the pair of discharge electrodes and a direction orthogonal to the discharge direction, wherein
  the conversion optical system is disposed on an optical path of the pulse laser beam between the solid-state laser apparatus and the amplifier,
  the conversion optical system includes a first prism and a second prism each having an isosceles triangular section parallel to the optical path axis and orthogonal to the discharge direction, and a third prism and a fourth prism each having an isosceles triangular section parallel to the optical path axis and the discharge direction,
  the first prism and the second prism are disposed so that apexes of the first prism and the second prism face to each other at the section of the first prism and the second prism, and
  the third prism and the fourth prism are disposed so that apexes of the third prism and the fourth prism face to each other at the section of the third prism and the fourth prism.

2. The laser system according to claim 1, further comprising:
  I. a first linear stage configured to reciprocate one of the first prism and the second prism in a direction of the optical path axis;
  J. a second linear stage configured to reciprocate one of the third prism and the fourth prism in the direction of the optical path axis; and
  K. a control unit configured to control the first linear stage to adjust an interval between the first prism and the second prism and configured to control the second linear stage to adjust an interval between the third prism and the fourth prism.

3. The laser system according to claim 2, further comprising
  L. a light intensity distribution measurement unit configured to measure the light intensity distribution of the pulse laser beam output from the amplifier, wherein the control unit controls the first linear stage and the second linear stage based on a measured value of the light intensity distribution measured by the light intensity distribution measurement unit.

4. The laser system according to claim 3, wherein the light intensity distribution measurement unit includes a beam splitter configured to reflect part of the pulse laser beam output from the amplifier, a transfer optical system configured to transfer the part of the pulse laser beam reflected by the beam splitter, and a two-dimensional image sensor configured to capture a transfer image transferred by the transfer optical system.

* * * * *